United States Patent [19]

Fischer

[11] Patent Number: 4,783,730

[45] Date of Patent: Nov. 8, 1988

[54] INPUT/OUTPUT CONTROL TECHNIQUE UTILIZING MULTILEVEL MEMORY STRUCTURE FOR PROCESSOR AND I/O COMMUNICATION

[75] Inventor: Michael A. Fischer, San Antonio, Tex.

[73] Assignee: Datapoint Corporation, San Antonio, Tex.

[21] Appl. No.: 910,006

[22] Filed: Sep. 19, 1986

[51] Int. Cl.[4] ............................................. G06F 13/00
[52] U.S. Cl. .................................................... 364/200
[58] Field of Search ... 364/200 MS File, 900 MS File

[56] References Cited

U.S. PATENT DOCUMENTS

| 4,253,146 | 2/1981 | Bellamy et al. | 364/200 |
| 4,415,971 | 11/1983 | Guillemet et al. | 364/200 |
| 4,426,679 | 1/1984 | Yu et al. | 364/200 |
| 4,644,463 | 2/1987 | Hotchkin et al. | 364/200 |

Primary Examiner—Eddie P. Chan
Attorney, Agent, or Firm—John R. Ley

[57] ABSTRACT

A multilevel communication structure controls input-/output (I/O) data transfers and control functions in a computer system. Communication is achieved through shared memory structures in main memory commonly connected to each processor and each I/O adapter in the system. The levels of the communication structure are for communicating information between adapters or processors and processors, for communicating information relative to I/O control functions of an I/O device, and for specifying I/O functional operations. The information contained in the memory structures may be directly interpreted by sequencers of the I/O adapters, to achieve the I/O data transfers.

31 Claims, 12 Drawing Sheets

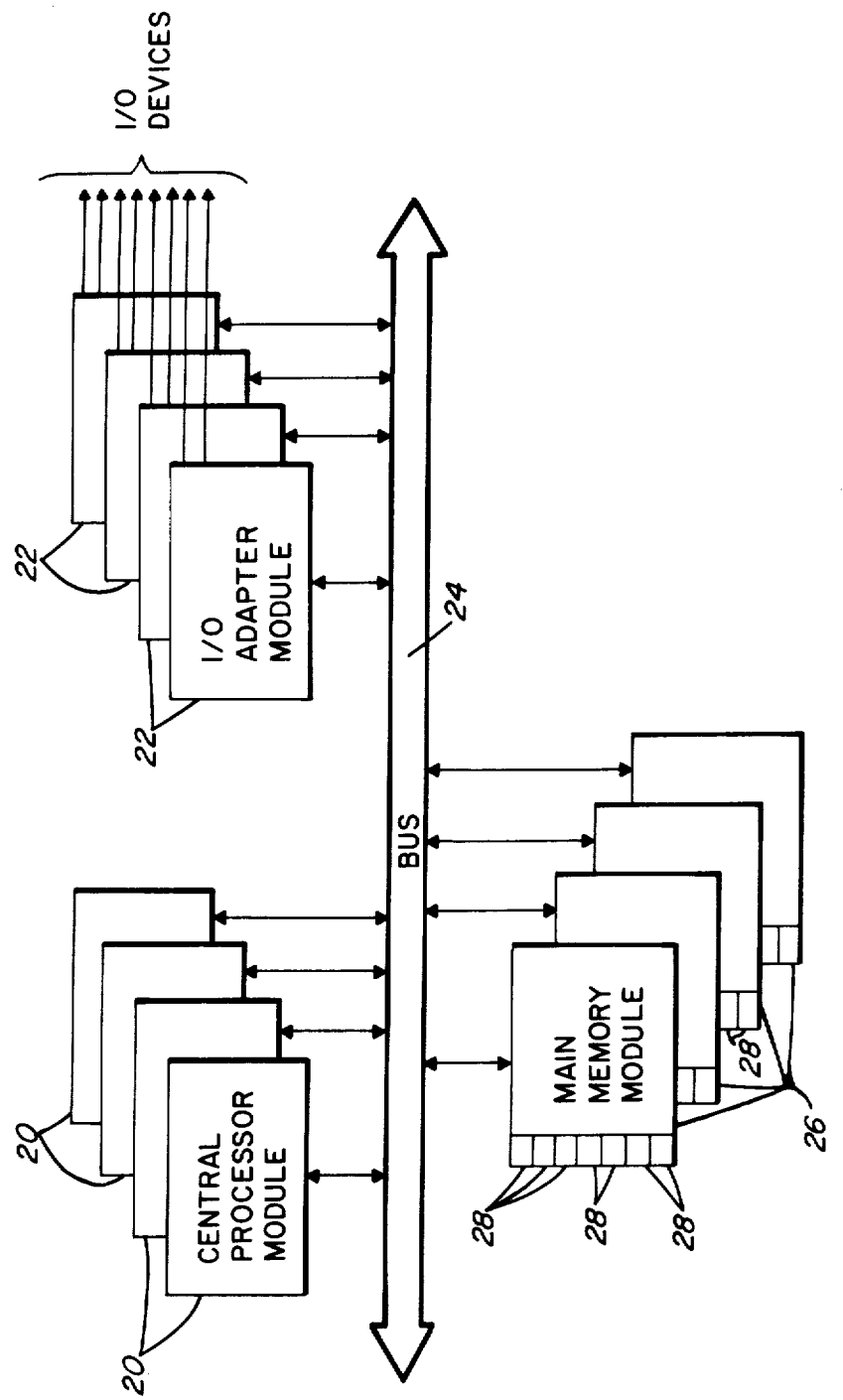
Fig_1

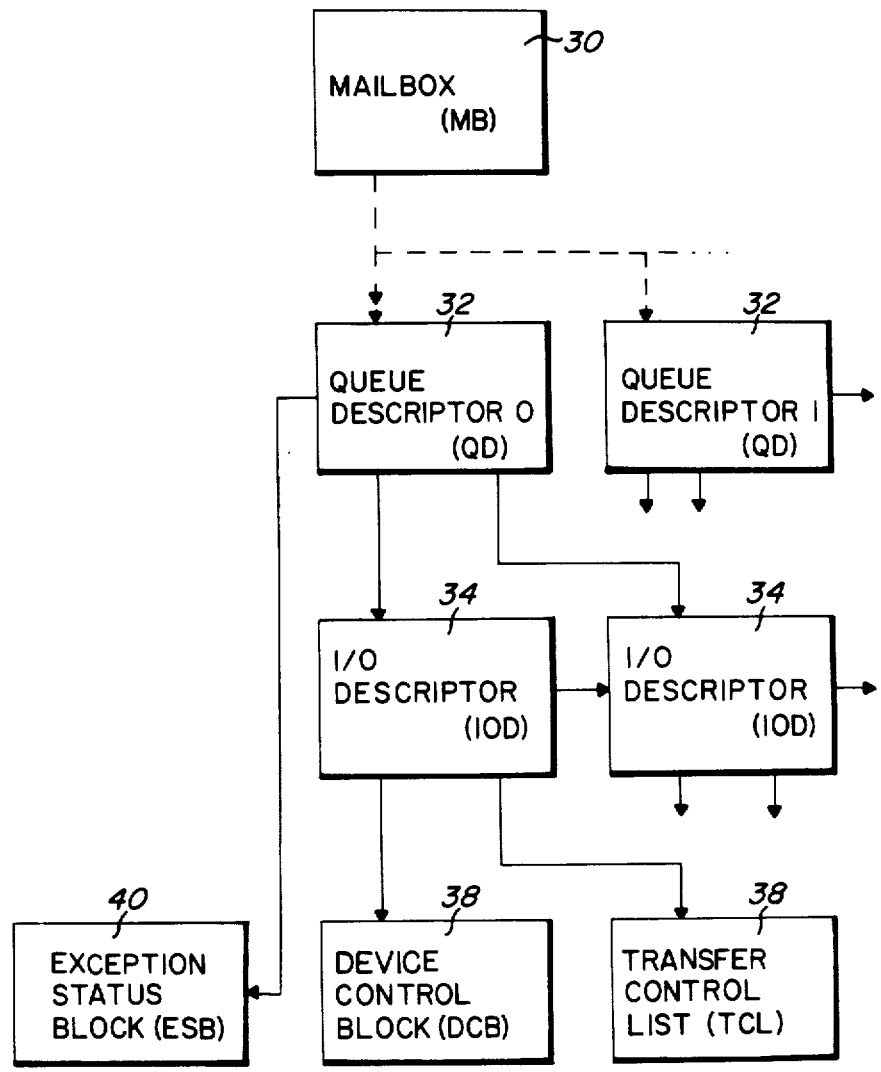
Fig_2

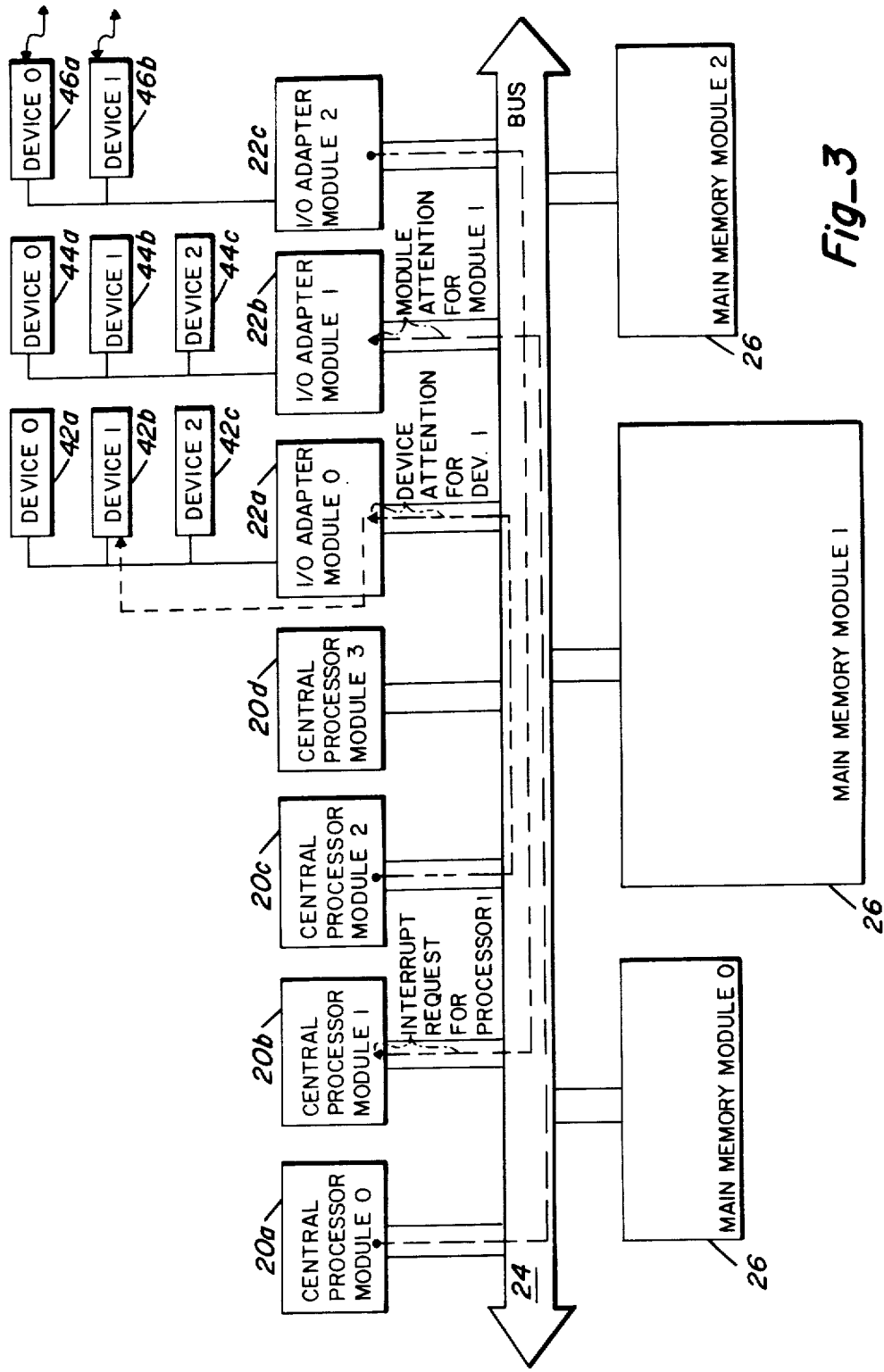
Fig_3

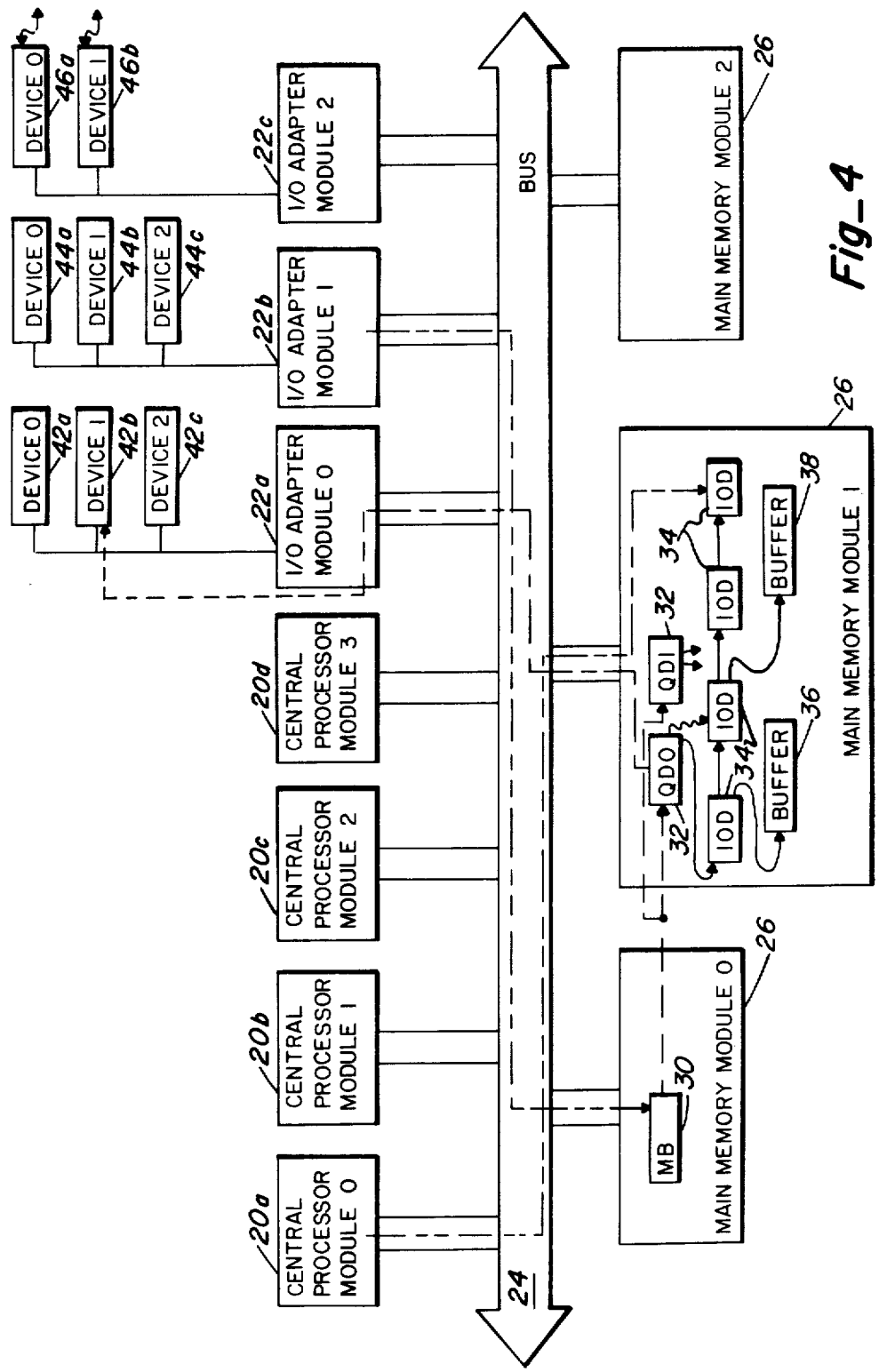
Fig_4

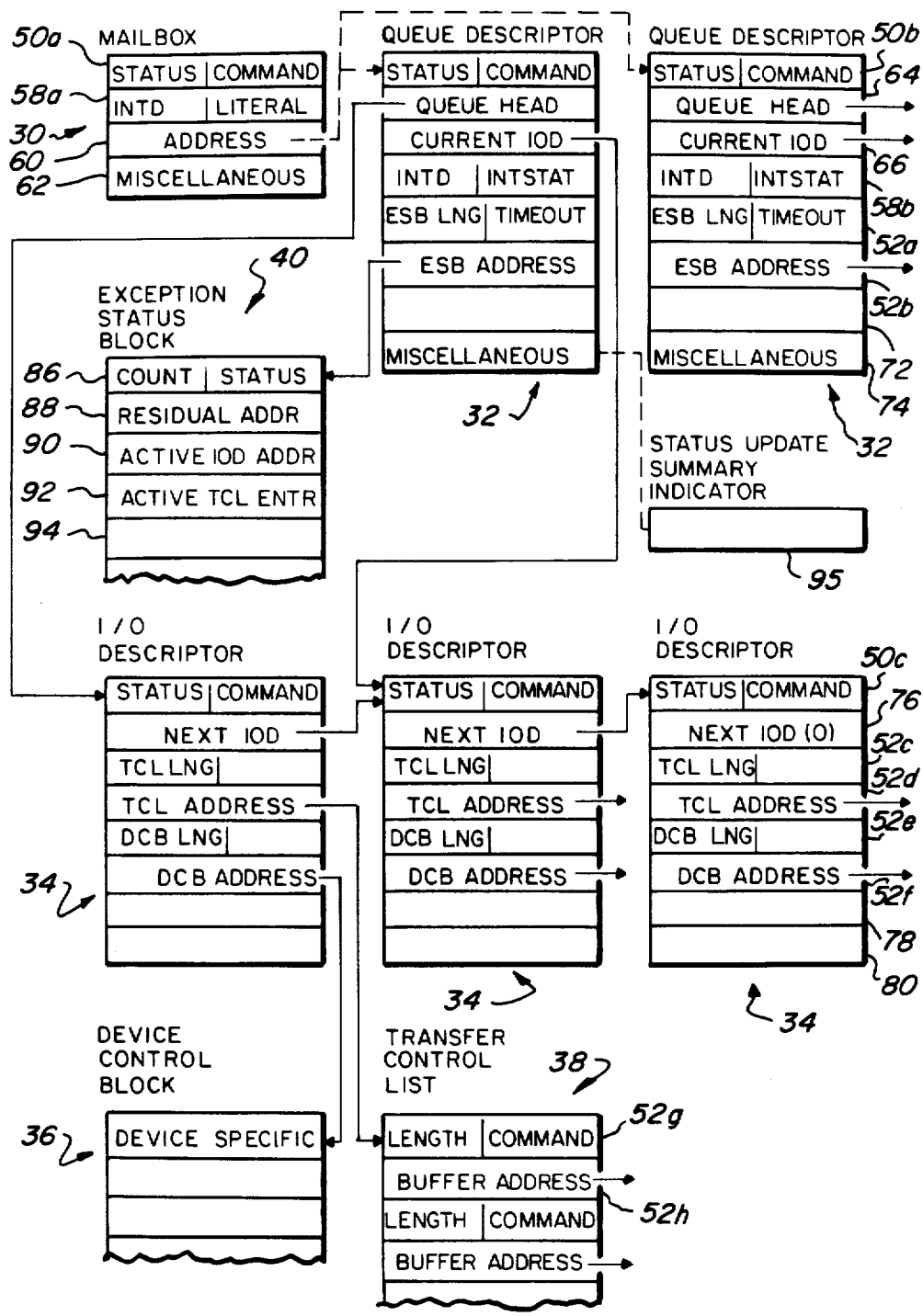
Fig_5

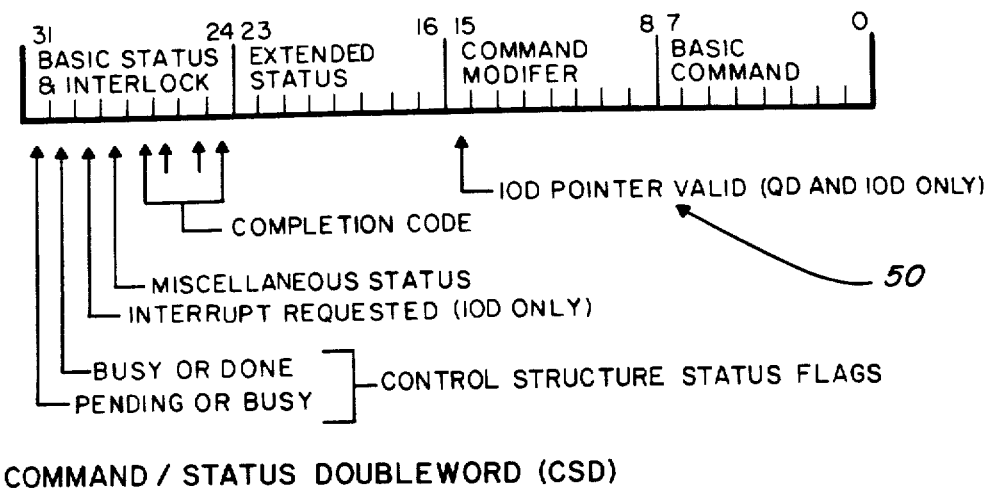
COMMAND / STATUS DOUBLEWORD (CSD)
Fig_6
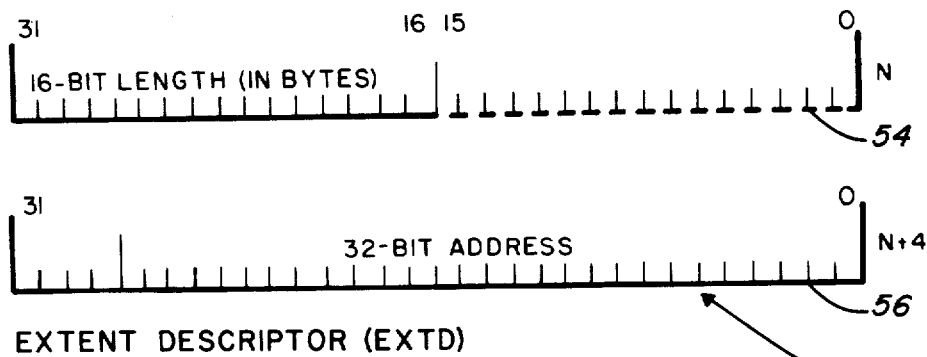
EXTENT DESCRIPTOR (EXTD)
Fig_7
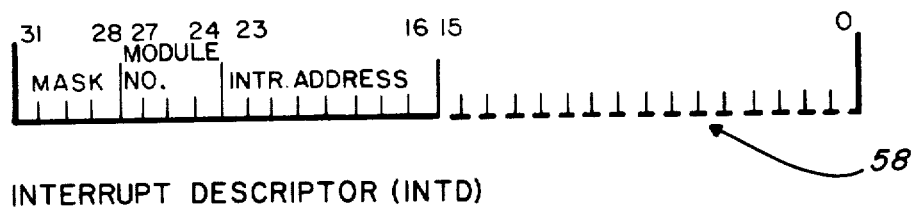
INTERRUPT DESCRIPTOR (INTD)
Fig_8

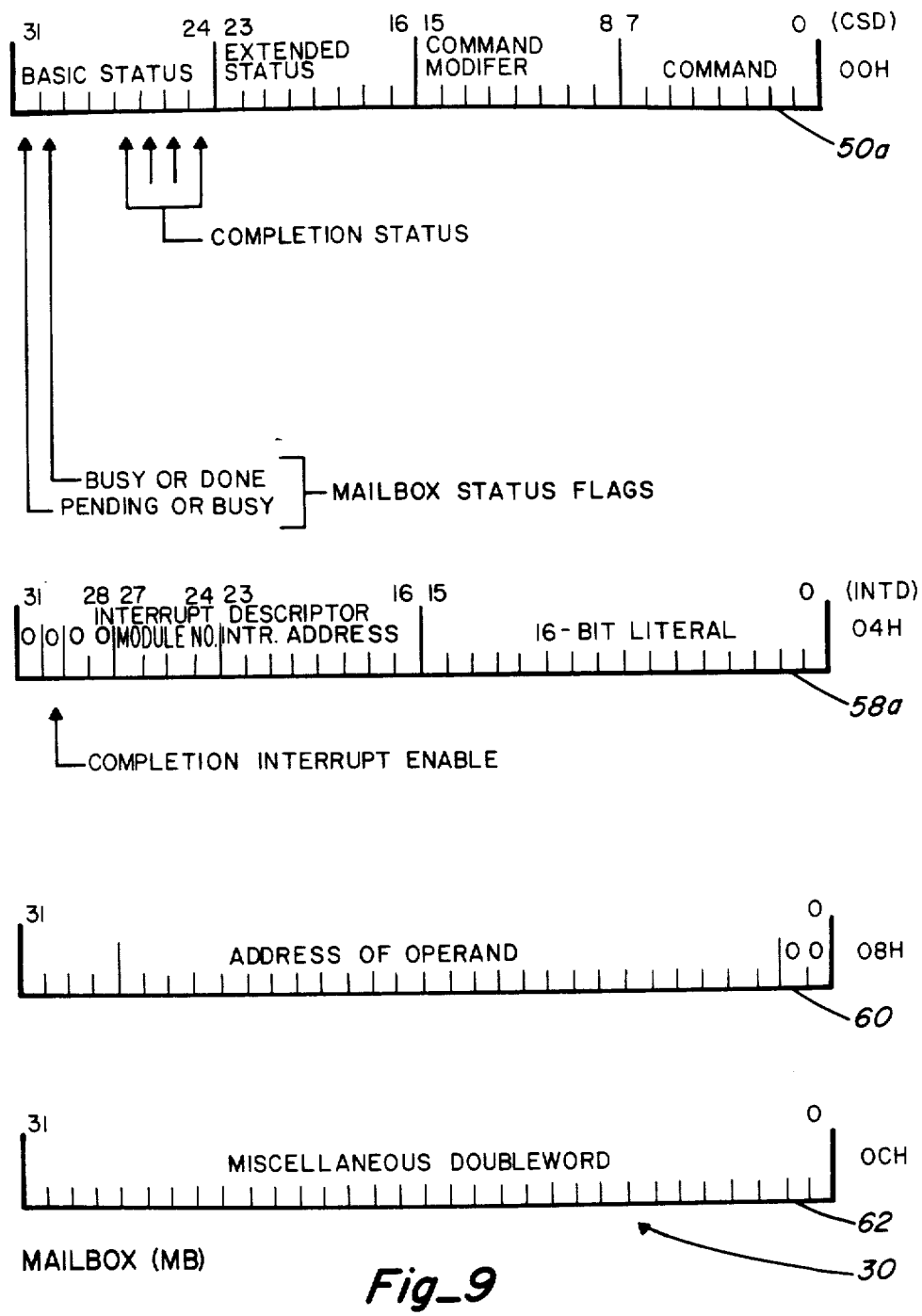
Fig_9

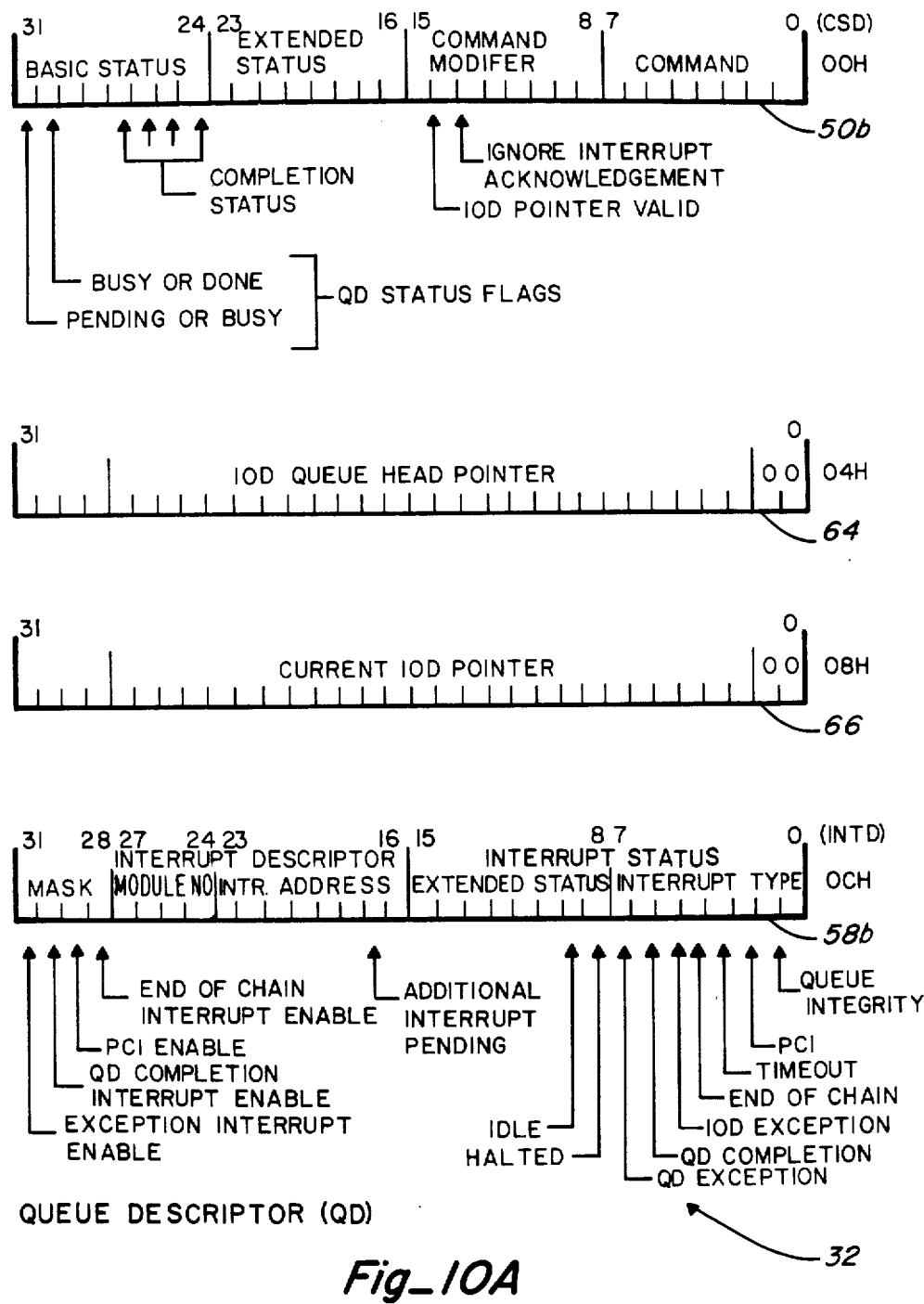
Fig_10A

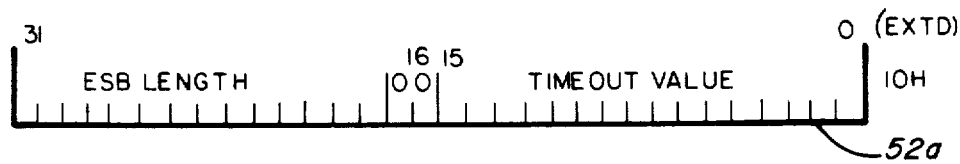
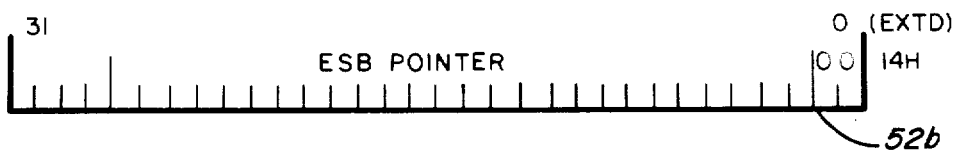
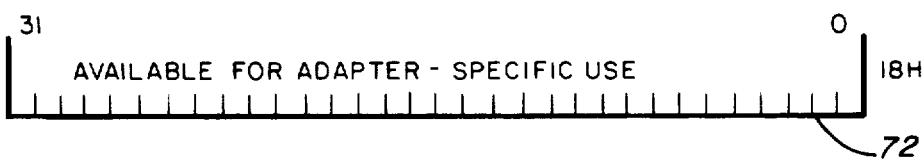
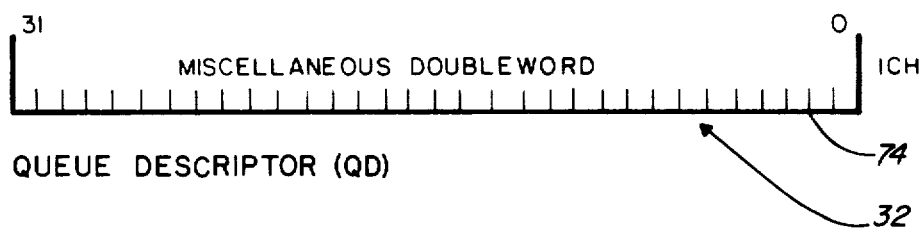
QUEUE DESCRIPTOR (QD)
Fig_10B

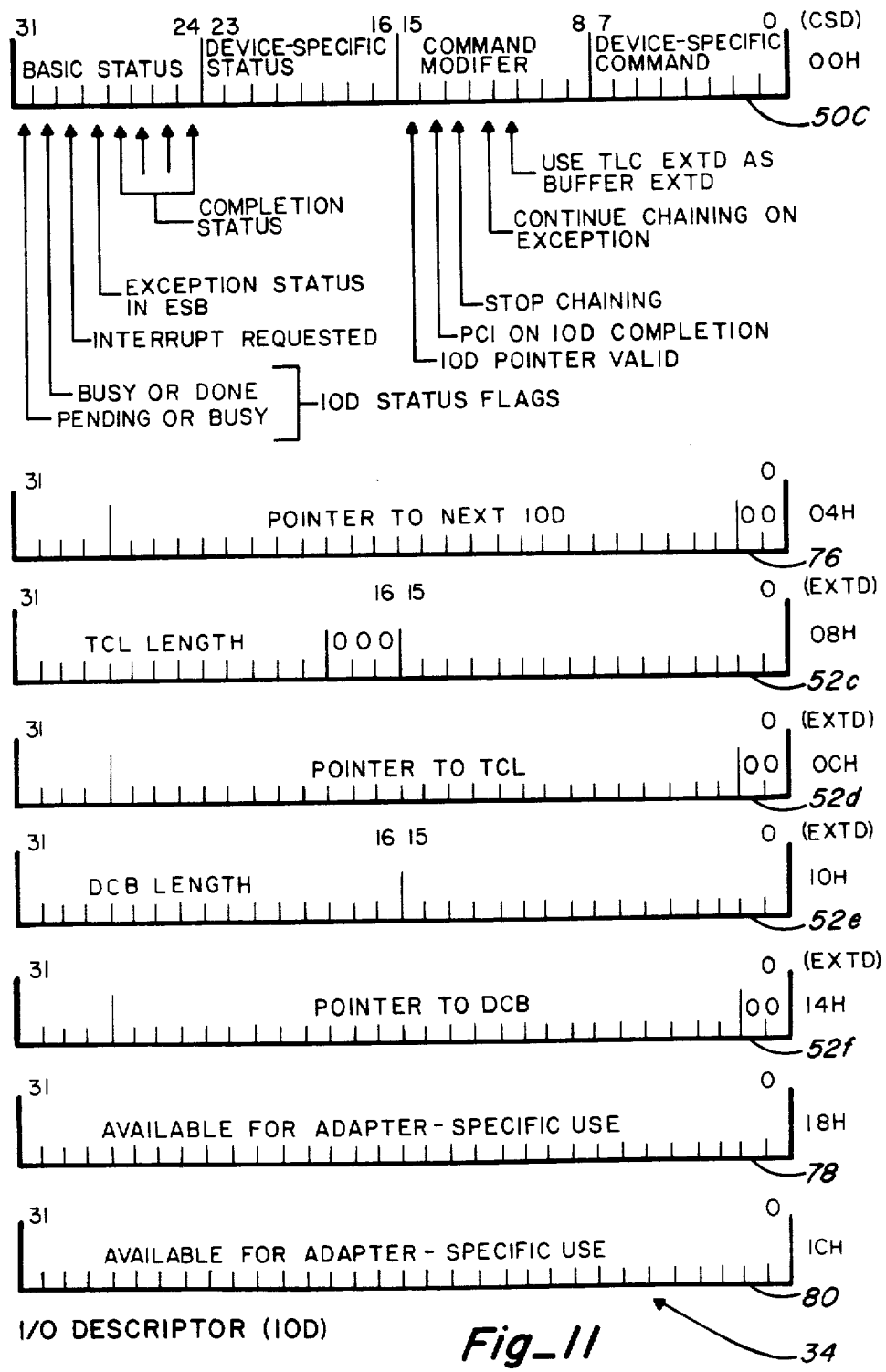

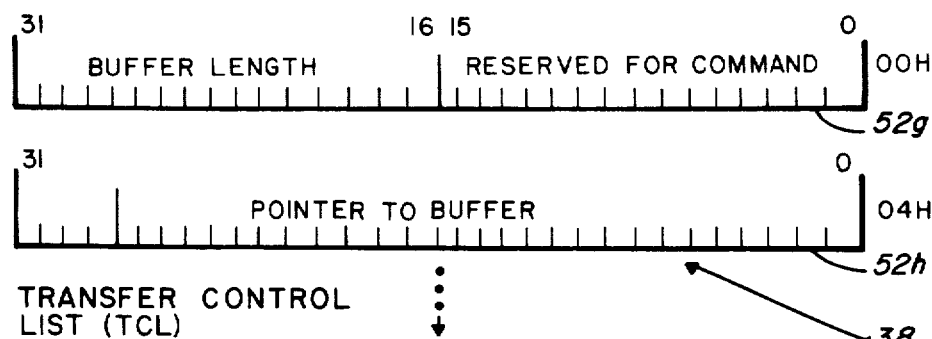
Fig_12
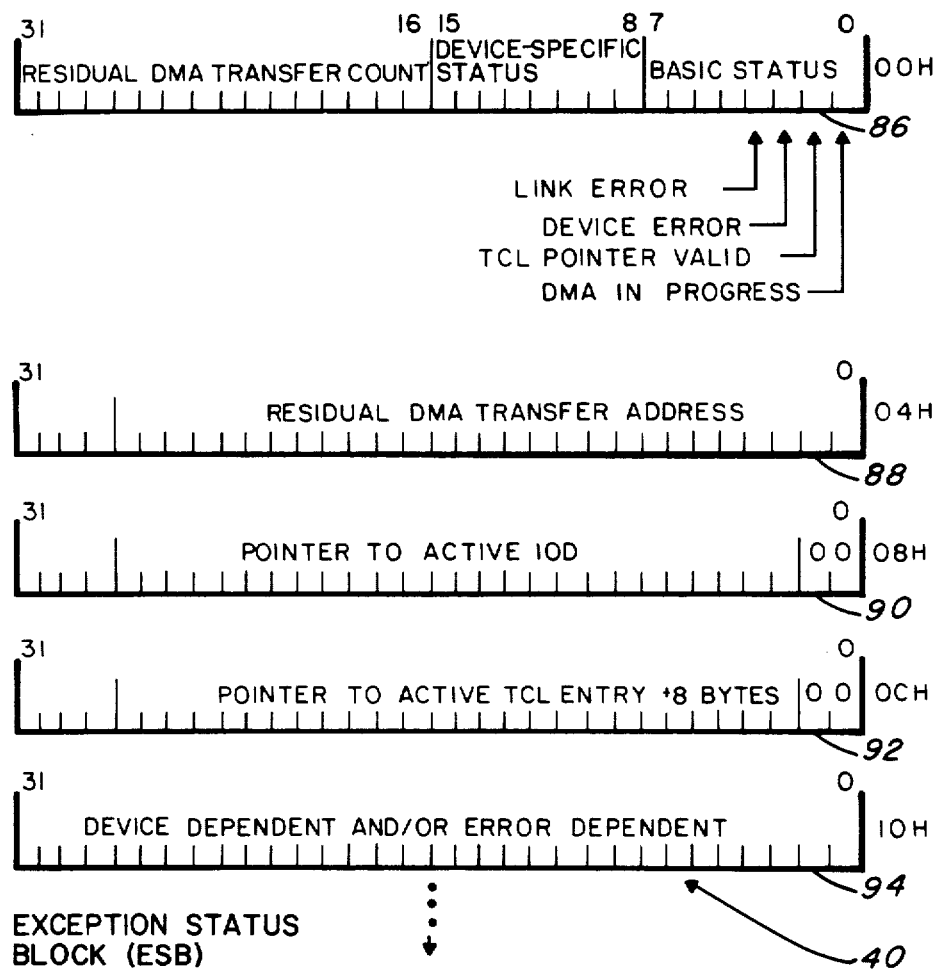
Fig_13

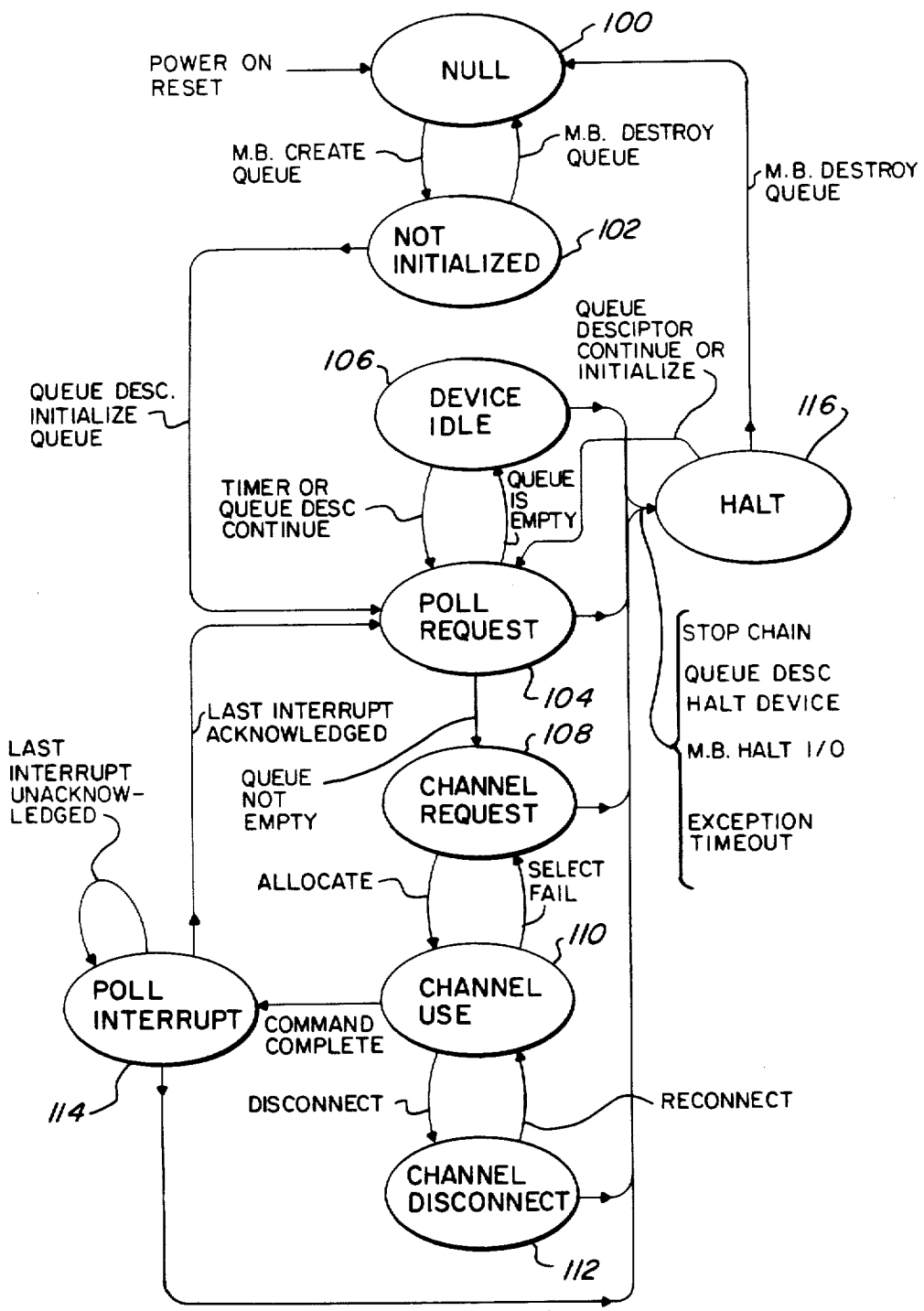
Fig_14

INPUT/OUTPUT CONTROL TECHNIQUE UTILIZING MULTILEVEL MEMORY STRUCTURE FOR PROCESSOR AND I/O COMMUNICATION

This invention pertains to a new and improved method for communicating input/output (I/O) functions between one or more central processing modules and one or more I/O adapter modules in a computer system, through the use of multiple levels of a communication structure based on shared memory structures in a common pool of main memory in the computer system.

This invention is related to another invention for an "Arbitration Technique for a Split Transaction Bus in a Multiprocessor Computer System" described in U.S. patent application Ser. No. 06/909,773 filed concurrently herewith, and assigned to the assignee hereof. The disclosure of this co-pending application is incorporated herein by this reference.

BRIEF BACKGROUND OF THE INVENTION

Most modern computer systems, especially multiprocessor systems, will run a plurality of user or application tasks concurrently. Each of these tasks, and the operating system itself, generate input/output (I/O) requests as the programs run. Usually these I/O requests are uncorrelated, which means that the requests have no specific relationship to each other between tasks. It is of considerable importance to handle the I/O requests efficiently and effectively so as to not unduly restrict the data throughput or processing capabilities of such multi-task computer systems.

In a computer system, there is at least one central processor, a main memory, and one or more I/O channels connected to I/O devices. These elements are connected within this processor-memory complex for doing input/output data communications. In many prior systems, the connection between the processor and the I/O channel is a fixed connection. If there is only one processor, as in a uniprocessor computer system, the fixed connections between the I/O devices and the processor do not create any restriction, because the single processor which controls all of the I/O devices can only proceed with one function at a time. In multiprocessor systems, those which involve multiple central processors, the fixed connection of each I/O channel to one processor can create problems. If the program running on one processor needs to access a device on an I/O channel connected to a different processor, the communication can occur, but only over a circuitous route. Such circuitous routes generally create inefficient data transfers and unnecessary data movement within system memory. The inefficiencies result primarily from the fixed connectivity of each I/O channel to a specific processor.

Data communication in a multiprocessor system sometimes requires the movement of data from one memory location to another memory location as a result of the fixed connectivity. It is usually inefficient to move data from one memory location to another memory location, because such memory movements do not contribute to meaningful data throughput or data processing efficiency. Moving data between a peripheral device and memory in either direction is acceptable, but moving data between different locations in main memory should generally be avoided if possible.

One common method of handling I/O requests in prior art computer systems is to utilize interrupts for accomplishing input/output functions. However, the nature of most modern processors (including the entire current generation of high performance microprocessors) is that interrupts are handled only at the expense of consuming relatively large amounts of time and processing resources. Accordingly, minimizing the occurrence of interrupts is quite important. Minimizing the occurrence of interrupts is also quite difficult with such prior art computer systems.

In many prior art multi-task multiprocessor systems, the I/O drivers tend to be somewhat complex in nature and it tends to be difficult to maintain their operating routines. This problem is further compounded if the I/O drivers and the processors to which they are connected in a fixed manner utilize specific operating codes applicable only to particular processor and the particular connected I/O drivers. The lack of commonality in such arrangements adds to the complexity of the system and generally involves inefficiency of data processing and data throughput.

In the past, some computer systems have used I/O processors or peripheral processors to essentially attempt to partition the I/O control functions between the I/O processors and the central processors of the system. Some of these I/O processing systems have worked reasonably well, but far more of them have actually slowed down data throughput and resulted in worse efficiency due to the added overhead in communicating between the central processor and the I/O processor.

SUMMARY OF THE INVENTION

Generally summarized, the present invention is for a method of communicating with I/O adapters and the I/O devices attached to them by utilizing shared memory structures in main memory. Any processor in the computer system can communicate with any other processor, I/O adapter or I/O device through the shared memory structures, because the I/O adapters and the processors of the system are commonly connected by the bus to main memory.

The method of the present invention utilizes a multilevel communication structure. The first memory structure, designated a Mailbox, is established for holding data for communicating module information between each processor and each I/O adapter. A second memory structure is established for holding data for communicating I/O device information between processors and the I/O devices associated with each I/O adapter. A third memory structure is established for holding data for communicating I/O device operations and for transferring data to and from the I/O device utilizing predetermined memory locations. A fourth memory structure is optionally established for holding data for communicating additional I/O device operations when the third memory structure is of insufficient capacity to fully specify the I/O device operation.

There is considerable uniformity in the structure of and content of the data placed in each memory structure, resulting in the use of only one operating code for all I/O operations in the system. The arrangement also avoids the use of I/O processors, since data within the memory structures is capable of being directly interpreted to control state engines or sequencers in each I/O adapter by which to perform the I/O data transfers. Once the memory structures are established, communication to and from the processors occurs directly through the structures, thereby avoiding restrictions resulting from requirements for communication through all hierarchical levels of the communication structure. Problems of fixed connectivity and of memory to memory movement are avoided by utilizing the shared memory structures and the multiple levels of the communication structure with pointers between them.

The present invention can be understood more completely by referring to the accompanying detailed description of a presently preferred embodiment of the invention, and to the accompanying drawings. The scope of the invention itself, however, is defined by the appended claims.

BRIEF DESCRIPTION OF THE DRAWINGS

FIG. 1 is a block diagram of a tightly coupled multi-processor computer system illustrating shared structures in main memory of the system through which communication is achieved between central processor modules and I/O adapters of the system, in accordance with the I/O control technique of the present invention.

FIG. 2 is an illustration of the four levels of communication structure of the present invention. Each of the blocks illustrated in FIG. 2 represents the control structures in the main memory of the computer system illustrated in FIG. 1, through which communication between the central processing modules and the I/O adapter modules is achieved.

FIG. 3 is a block diagram similar to FIG. 1 additionally illustrating I/O devices attached to I/O adapter modules and further illustrating Module Attention, Device Attention and interrupt request signals communicated between the central processing modules and the I/O adapter modules, which form a part of the I/O control technique of the present invention.

FIG. 4 is a block diagram similar to FIG. 3 illustrating the control structures shown in FIG. 2 in main memory modules of the computer system, and the communication path of signals between a central processing module and an I/O adapter module to these shared structures in main memory.

FIG. 5 is a block diagram illustrating the various control structures shown in FIG. 2 in greater detail.

FIGS. 6, 7 and 8 are illustrations of the memory layouts of common substructures employed in several of the control structures illustrated in FIG. 5, specifically a Command/Status Doubleword, an Extent Descriptor, and an Interrupt Descriptor, respectively.

FIGS. 9, 10A and 10B (jointly) 11, 12, and 13 are illustrations of the memory layouts of the control structures for the Mailbox, Queue Descriptor, I/O Descriptor, Transfer Control List, and Exception Status Block, respectively, all of which are shown in FIG. 5.

FIG. 14 is a state transition diagram illustrating the operation of an exemplary device attached to an I/O adapter module, in accordance with the present invention.

DETAILED DESCRIPTION

A tightly coupled multiprocessor computer system, for which the present invention offers substantial advantages but is not necessarily restricted, is illustrated in FIG. 1. The system comprises a plurality of central processor modules 20 and a plurality of input/output (I/O) adapter modules 22 which are connected by a system bus 24. The computer system also utilizes a common pool of main memory formed by memory modules 26. Each I/O adapter module 22 is connected to one or more I/O devices, not specifically shown in FIG. 1. All communications between the central processor modules and the I/O adapter modules occurs through structures 28 in one or more of the main memory modules 26. Each structure 28 is one or more addressable memory locations in the main memory modules 26.

Since all of the modules in the system are connected to the bus 24, the central processor modules 20 and the adapter modules 22 can each access the structures 28 in the main memory modules 26. It is therefore apparent that there is no fixed connection between any of the central processors and any particular I/O adapter. Instead, any central processor can access any I/O adapter by writing to the structures 28 in main memory, and thereafter the I/O adapter can read the structures. Similarly, any adapter module 22 can communicate information to any central processor module by writing to the structures 28 and the central processor can thereafter read the structures 28. The communication between the processor modules 20 and adapter modules 22 thus offers dynamic connectivity, thereby avoiding the use of circuitous data routing and memory to memory movements. By employing the I/O control technique of the present invention for communicating between the processor and memory modules, the requirements for special codes, peripheral processors and the like are avoided. The common applicability of the present I/O control technique to all the modules contributes to increasing the data throughput and system operating efficiency.

Although FIG. 1 illustrates a multiprocessor computer system, the present invention is equally applicable on uniprocessor systems. Substantial advantages occur, however, when the present invention is used in a multiprocessor computer system.

In the preferred embodiment of the present invention, all control structures 28 are made up of groups of doubleword memory locations which are aligned on doubleword boundaries in the main memory modules 26. A doubleword consists of a 32 bit entity made up of two adjacent 16 bit words. Each word is two bytes in length. In the control structures, the doublewords are aligned because their low order bytes are located at memory addresses which are zero modulo their size in bytes. Aligned words are at even addresses and aligned doublewords are at addresses which are integer multiples of four.

The present invention provides a four level communication structure utilizing the control structures in the shared pool of main memory. The four levels of the communication structure are illustrated in FIG. 2. Each level includes at least one control structure. The upper level control structure is designated a Mailbox (MB) 30. The Mailbox 30 is used for communication between a processor module and an I/O adapter, or between two processor modules, and is for dealing with the processor modules 20 and adapter modules 22. Functions accessible at this level include initialization, diagnosis and error recovery.

There is one Mailbox for each physical module 20 and 22 (FIG. 1). Each Mailbox exists at a fixed physical location or address in the main memory modules 26 (FIG. 1) which is uniquely associated with each module. The fixed physical address or location may be based on an assigned module number or any other means by which the unique unambiguous address in main memory can be determined. This unique unambiguous address must be such that each module can uniquely determine what that address is for every other module and access the Mailbox associated with every other module. This address is preferably based on the slot number or connector into which the module is connected as described in the co-pending application described above.

In addition to the purpose of sending control functions that concern the modules of the system, the Mailbox also serves as means for initializing the lower levels of the four level communication structure. These functions concern the module itself, and do not relate to any device or communications channel attached to the module. There are no commands that are sent through the Mailboxes 30 to actually cause input/output to occur.

The second level in the communication structure is designated by Queue Descriptors (QD) 32. Each Queue Descriptor 32 is created as a result of a command communicated through the Mailbox 30. Queue Descriptors are also destroyed as a result of commands communicated through the Mailbox 30.

In order to perform input/output functions or any other communication associated with I/O device control, a Queue Descriptor 32 must be created as a control structure in main memory 26 (FIG. 1). Once the Queue Descriptor has been created, it is possible to communicate with the device specified when the Queue Descriptor was created. Once all necessary Queue Descriptors have been created there is little further need for the Mailbox and all communications other than for catastrophic error recovery can directly occur through the Queue Descriptor or its subsidiary control structures.

More than one Queue Descriptor 32 can be created for use by a single I/O adapter module by a sequence of commands at the Mailbox 30. Most I/O adapters are capable of supporting multiple Queue Descriptors concurrently. There is one Queue Descriptor for each device attached to the adapter. In this context a "Device" refers to an entity supported by the I/O adapter in a manner capable of performing I/O operations independently from and concurrently with other such entities. In the case of single device controllers which are capable multiple concurrent operations (for example, the transmitter and receiver portions of a full duplex network interface), more than one Queue Descriptor Device may be associated with a single physical device. However, in the case of multiple devices interfaced via a device controller not capable of overlapped operations (for example, a tape controller which can attach up to four tape drives but only transfer to one at a time), a single Queue Descriptor Device may be associated with more than one physical apparatus or device.

The functional purpose of each Queue Descriptor 32 is to hold control information needed by the processors and the I/O adapters to maintain a queue of I/O Descriptors (IOD) 34 for a given Device attached to the adapter.

The actual input/output communication is accomplished by interpreting I/O Descriptors (IOD) 34, which are utilized at the third level of the communication structure. Each I/O Descriptor contains the basic control information for a single I/O operation by a single Device. Each of the I/O Descriptors for a Device are linked together in the order of operations to be performed to establish the Device queue for the Device. The Device queue of linked I/O Descriptors allows the I/O adapter to proceed to the next command in an I/O Descriptor upon the completion of the previous command without requiring the intervention of a processor, in an operation known as command chaining. This is of considerable advantage in the present invention because it reduces or eliminates the necessity of extensive interrupts to the processors.

In the case of simple I/O Devices, it is generally possible to fully specify the I/O operation in the I/O Descriptor 34. However, in the case of more complex I/O Devices, there is a need for more device specific control information. In order to make all of the I/O Descriptors 34 uniform in content, the extended control information for an I/O Device is not included within the I/O Descriptor. Instead, an ancillary control structure designated as a Device Control Block (DCB) 36 is created.

The contents of the Device Control Block 36 are arbitrary, and depend on the specific type of I/O Device connected to the adapter. The Device Control Block 36 is simply a flexible means of allocating memory to hold the Device specific commands necessary for accomplishing a single I/O operation for a particular I/O Device. The Device Control Block 36 occupies the fourth level of the communication structure.

A Transfer Control List (TCL) 38 can also be used in conjunction with each I/O Descriptor 34, at the fourth level of the communication structure. The Transfer Control List is a list of one or more buffer descriptors which allow one or more separate, non-contiguous areas of memory to be logically associated with a single I/O operation. This allows transfers to and from data buffers to occur wherever it is most advantageous for the data buffers to exist in memory, rather than having to move data to pre-allocated or fixed buffers in order to accomplish I/O transfers. What is often called a scatter or gather capability is obtained. For an output operation the data can be gathered from the separate areas of memory, and for an input operation the data can be scattered to these separate areas of memory. This scattering or gathering capability ha the advantage that the information is recorded in buffers where the higher level operating software of the system wants the data located without involving an unnecessary memory to memory movement of that information.

An Exception Status Block (ESB) 40 is illustrated in FIG. 2, although the Exception Status Block is not a distinct level within the communication structure. The Exception Status Block 40 is logically a part of the Queue Descriptor 32. The Exception Status Block 40 is not physically a part of the Queue Descriptor because it is desirable to keep the Queue Descriptor to a fixed size. The Exception Status Block 40 is sometimes not needed at all, and when it is needed it is variable in size. Accordingly, the Exception Status Block 40 is made separate from Queue Descriptor 32. The Exception Status Block 40 is linked to the Queue Descriptor by a pointer.

The function of the Exception Status Block 40 is to provide memory space for storing information concerning the status of exception conditions which may have occurred while performing Device level commands. One Exception Status Block is associated with each Queue Descriptor 32. While the exceptions reported upon actually occur due to processing of I/O Descriptors, allocation of an Exception Status Block for every I/O Descriptor 34 could waste a considerable amount of memory, because exceptions in processing I/O functions are infrequent. Instead, the use of the single Exception Status Block 40 for each Device allows it to be shared among all of the I/O Descriptors 34 associated with a Queue Descriptor 32. In actuality, the function of the Exception Status Block 40 is down at the fourth level of the communication structure, as illustrated in FIG. 2, since it records exception conditions relating to the I/O Device operations.

As long as I/O operations complete successfully without exceptions, the processing of I/O Descriptors will continue sequentially down the Device queue from I/O Descriptor to I/O Descriptor. If an exception occurs, the information explaining what went wrong and when during the operation the problem occurred is placed in the Exception Status Block 40, and processing stops until the exception is handled by software on a central processor. When an exception occurs device operations for that device cannot safely continue and something is indicated as wrong. Once the exception condition has been corrected, there is no longer any reason to keep the exception information stored in memory, allowing the same Exception Status Block 40 to be re-used when processing of the Device queue is resumed.

In order to utilize the communication structures illustrated in FIG. 2, and specifically the Mailbox 30, a means or signal for instructing a module to inspect its Mailbox is required. This instruction to a module to inspect its Mailbox is achieved by a logical operation known as a Module Attention. As is shown in FIG. 3, a Module Attention signal is illustrated as originating from a central processing module 20a, being communicated over the system bus 24 to an I/O adapter 22b. The I/O adapter module 22b receives the Module Attention at a high priority or non-maskable interrupt. The Module Attention causes the I/O adapter 22b to inspect the contents of its Mailbox by reading the information contained in the Mailbox. Such a reading operation is illustrated in FIG. 4 wherein the I/O adapter module 22b is receiving information from the Mailbox over the system bus 24. The information received from the Mailbox instructs the I/O adapter 22b to perform certain functions.

In the previously mentioned application filed concurrently herewith, there is described a control space transfer operation over the bus. A series of control space addresses are allocated for Module Attention functions in the present invention. In the case of the previously mentioned application, the Module Attention has been implemented as control transfers conducted over the parallel bus of the computer system. The Module Attentions can also be conducted between modules by serial signal transfers over a bit serial, i.e. a one bit wide serial communication link. Any means of sending a signal which the module interprets as a Module Attention, which causes it to inspect its Mailbox, is sufficient for the purposes described. The Module Attention signals must be uniform and the means for sending them applicable to all modules of the system.

Various Devices 42a, 42b, 42c, 44a, 44b, 44c, 46a and 46b are shown connected to the I/O adapter modules 22a, 22b and 22c shown in FIGS. 3 and 4. Shown in FIGS. 3 and 4, each Device is connected to each I/O adapter by a common I/O channel; however it is also possible for a single I/O adapter to connect to multiple I/O channels in support of a plurality of devices.

In order to start the I/O adapter to perform an I/O function, a Device Attention command is communicated between modules. The Device Attention is directed to one of the devices attached to an I/O adapter, as is shown in FIG. 3. The Device Attention shown in FIG. 3 is communicated between the central processing module 20c and the I/O adapter module 22a. The I/O adapter module 22a includes circuit elements which recognize the Device Attention signal and begin processing the Device queue for a particular identified Device attached to the module 22a. As shown in FIG. 3, device 42b is the target of the I/O operations performed as a result of the communication of the Device Attention from the processor 20c to the I/O adapter 22a.

The Device Attention signal instructs the I/O adapter module to inspect the Queue Descriptor for the designated Device, and to execute any command which it finds in the Device queue supported by the Queue Descriptor. FIG. 4 illustrates the effect of the Device Attention signal (FIG. 3), in that I/O adapter module 22a is reading commands for Device 42b from an associated Queue Descriptor 32. After the Mailbox command has created Queue Descriptors for each device attached to each I/O adapter module, communication between the central processors and the I/O devices occurs directly with the Queue Descriptors and not through the Mailbox. The commands in the Queue Descriptor which are most usually executed upon the receipt of a Device Attention are those to initialize the queue, i.e. set the current pointer back to equal the head pointer and start at the beginning; halt Device queue processing; or continue processing the queue which is to resume queue processing, all of which are described in greater detail below.

Again, as has been described in the co-pending application Device Attentions can be communicated through control space transfers on the system bus 24. Any means that allows for an unambiguous communication of a signal between any module and any other module would also be usable for communicating a Device Attention, provided that such a signal also discriminates between the various devices attached to an I/O module.

Each of the control structures which are used in the I/O control technique of the present invention are shown in greater detail in FIG. 5. All of the control structures shown in FIG. 5 are made up of doublewords located in aligned doubleword memory locations or boundaries in the pool of main memory. The number of doublewords in each control structure and their field layout and the pointer linkages between them are more completely discussed below in conjunction with FIGS. 6 through 13.

To achieve simplicity of interpretation and consistency among the various control structures illustrated in FIG. 5, many common substructures are included within each of these control structures. The common control substructures include a Command/Status Doubleword (CSD), and Extent Descriptor (EXTD), and an Interrupt Descriptor (INTD), shown respectively in FIGS. 6, 7 and 8.

The Command/Status Doubleword is the fundamental means for processors to send commands to and receive status from I/O adapters and devices. The Command/Status Doubleword also provides for indicator based synchronization between each processor and the I/O adapters. A Command/Status Doubleword appears as the first doubleword in each Mailbox 30, Queue Descriptor 32, and I/O Descriptor 34 as shown in FIG. 5.

As is shown in FIG. 6, the Command/Status Doubleword 50 is a 32 bit entity that is divided into two 16 bit words. The high order word, bits 16 to 31, contains status information, both basic and extended. The low order word, bits 0 to 15, includes command information. The low order word is used to communicate information from the sender to the recipient through this control structure. The status word is used to communicate information from the recipient back to the sender. The sender module pre-initializes the command word to contain the command and command modifier appropriate for what the sender module wants accomplished, and initializes the status word to being essentially null. Subsequently, the recipient of this Command/Status Doubleword 50 interprets the command information, and then will thereafter interpret the remaining information in the Mailbox, Queue Descriptor, or I/O Descriptor in the context of this command information. The recipient thereafter performs the command and reports the successful completion of the command or an error condition upon attempting to execute that command. This reporting on the status of the command is written into the higher order word of the Command/Status Doubleword.

The basic command byte, bits 0 to 7, specifies the fundamental operation to be performed by the recipient of a Command/Status Doubleword. All other fields in the control structure remain either operands for use in performing this command or space to return status concerning the command. Unique command codes are assigned for Mailboxes, for Queue Descriptors, and for I/O Descriptors, so as to be distinguishable from one another. This simplifies command decoding and allows simple checking for errors related to attempting to execute a command at the wrong level of control structure.

The command modifier byte, bits 8 to 15, contains indicators of modalities pertaining to an adapter's processing of the command indicated in the basic command byte. Bit 15 is used in the Command/Status Doublewords of Queue Descriptors and I/O Descriptors to contain a flag to indicate that the IOD pointer in the doubleword immediately following this Command/Status Doubleword contains a valid address. This indication is necessary to allow 16 bit processors to be used with the present invention, since such 16 bit processors are not capable of updating doubleword address values in a single bus cycle. It is therefore necessary to have this means to mark this pointer invalid to prevent the possibility of an I/O adapter attempting to use an address pointer with only one of its two words valid. When polling an idle queue, the bit 15 of this Command/Status Doubleword is actually being tested by the I/O adapter. The usage of bits 14 to 8 of the command modifier byte is specific to particular control structures.

The extended status byte, bits 16 to 23, is available for adapter-specific or devicespecific status reporting in cases where status information will not fit within the basic status byte, bits 24 to 31. The basic status byte is the primary means of communicating a completion status of the command specified by this Command/Status Doubleword.

The basic status byte also serves as an interlock to restrict access by any processor to the control structure containing this Command/Status Doubleword while the control structure is awaiting processing by the I/O adapter and while the adapter is performing the operation. An interlock provides mutual exclusion locking of a control structure. Interlocks exclude access by a requestor (usually a processor) while a control structure is in use by a server (usually an adapter). Bits 31 and 30 serve as control structure status flags, and these bits are the general status bits relating to execution of the command specified in the basic command byte. Bit 31 also serves as the structure interlock. Bit 29 is set to "1", in I/O Descriptors, at the end of the operation specified by the basic command status byte if the device function in the adapter processing this I/O Descriptor requested an interrupt as a result of attempting to execute, executing, or completing the processing of this command. The state of bit 29 is not changed by the adapter other than when reporting status at the end of an operation. Bit 28 is a general purpose status bit for use in a structure dependent manner. Bits 27 through 24 contain the completion status for the command specified in the basic command byte. Completion code assignments are control structure specific.

The interlocking function performed by bits 30 and 31 in the basic status byte is significant in the present invention. In multiprocessor computer systems where any one of the processors or other modules may seek access to a given memory location or control structure simultaneously, it is necessary to have a means by which to protect the critical memory segment so that it may be acted on by only one module at a time and until the particular transaction is completed. Such an arrangement is known as an interlock, a spinlock, a hardlock or the like. The normal manner of implementing an interlock requires an operation referred to as a test and set. However, as a result of the present invention and the use in particular of the control structure status flags in bits 30 and 31 of the Command/Status Doubleword, it is possible for the present invention to operate successfully in a multiprocessor environment with true simultaneity without requiring the use of test and sets by I/O adapter modules.

The two status flags at bits 30 and 31 of the Command/Status Doubleword indicate that the processors should neither modify the control information nor act on the status information in the particular control structure while that structure is awaiting processing by an I/O adapter or while the I/O adapter is performing the operation specified in the control structure.

To provide an indication of when such conflicting access may occur, and to prohibit it, the control structure status flags at bits 30 and 31 serve as an interlock.

The two status flags at bits 30 and 31 can designate any one of four states or status codes. A first "available" state indicates that there is no active command information in the control structure and that any status information which may have been present has already been interpreted by a processor. Control structure contents may not be interpreted by adapters while "available" status is indicated.

The two status flags in bits 30 and 31 can also indicate "pending". A pending state indicates that a processor has placed command information into this control structure and the control structure is currently awaiting processing by an adapter. Control structure contents may be neither interpreted nor modified by processors while pending status is indicated. One exception to this is that link pointers indicated to be invalid (by bit 15 of the command modifier) may be updated to become valid and then be marked valid by processors at any time. A control structure must be in a pending state when an I/O adapter begins to process its contents or the adapter will generate an error condition and halt its processing.

Another state indicated by the two status flags of bits 30 and 31 is "busy". A busy state indicates that this control structure is being processed by an I/O adapter. Control structure contents may not be interpreted nor modified by processors while a busy status is indicated, other than the update of linkage information (noted at bit 15).

A "done" status can also be indicated by the two status flags at bits 30 and 31. A done status indicates that processing of the command specified by this control structure has been completed by the adapter and that the completion status has been returned. Control structure contents may not be interpreted by adapters while done status is indicated.

Examples of codes for the status flags are "00" for "available", "10" for "pending", "11" for "busy" and "01" for "done". Using this set of code values, whenever bit 31 of the Command/Status Doubleword is set to a "1" other status information in the control structure containing the Command/Status Doubleword is not guaranteed to be valid and must not be interpreted by processors. In effect, when bit 31 is set to a "1" the control structure is "owned" by the I/O adapter, and when bit 31 is set to "0" the control structure is "owned" by the central processors. Adapters set the basic status byte to indicate a busy status before they read the Command/Status Doubleword to obtain the command information. Because processors are not permitted to modify control structures marked "pending" it is not necessary for the I/O adapter to use a test and set transaction to mark the control structure busy.

The use of the available status code is at the option of system software. Adapters begin processing control structures when directed to do so, either by attention conditions or command chaining. The adapters require that the initial control structure be "pending" and unconditionally set the status to "busy" and subsequently to "done". The ability to distinguish available and done status may be useful to system software in generating and managing control structures, especially in a multi-processor environment. If the system software elects not to use the "available" status, this software must still keep track of which control structures marked "done" are awaiting interpretation by I/O driver software and which control structures marked "done" are available for re-use. I/O adapters never set control structure status to "available".

Since the operations to switch the state of the Command/Status Doubleword can be done with normal write operations by either the processors or the I/O adapters, there is no need for performing any test and sets in the computer system to achieve interlocking between processors and I/O adapters. The performance of test and sets can be very consumptive of time and the throughput of the system is improved by utilizing the normal write function to indicate the status in the command status doubleword as described above.

An Extent Descriptor (EXTD) substructure is provided for communicating the starting addresses and lengths of all data buffers and certain variable length control structures. One such Extent Descriptor 52 is shown in FIG. 7. Extent Descriptors are substructures used in the Queue Descriptor, I/O Descriptor, Transfer Control List and Exception Status Block control structures.

The Extent Descriptor 52 includes a first doubleword 54 and second doubleword 56 aligned in memory at sequential doubleword address memory locations. The high order word in the first doubleword 54 is a length field. The low order word at bits 0 to 15 is available for control structure specific usage. The length field at the high order word specifies the number of sequentially ascending bytes in the data structure defined by this Extent Descriptor. A length value of 0 is not valid and will be rejected by the I/O adapter as an exception. The second doubleword 56 of the Extent Descriptor 52 contains an address field. The address field specifies the starting memory space address of the data structure defined by this Extent Descriptor. The Extent Descriptor format places no alignment restrictions on the address of the target data structure.

An Interrupt Descriptor (INTD) 58 shown in FIG. 8 is the substructure used to communicate the conditions upon which to request interrupts, the destination module which is to be interrupted, and the level at which the interrupt is to be requested. Interrupt requests are communicated from I/O adapters to processors, as shown in FIG. 3, where I/O adapter 22c is requesting an interrupt to processor 20b. Interrupt Descriptors 58 are used in Mailboxes and Queue Descriptor control structures.

As is shown in FIG. 8, the Interrupt Descriptor 58 occupies the higher order word of the doubleword 58, i.e. bits 16 to 31. The contents of the low order word, bits 0 to 15 are available for control structure specific usage. A mask field at bits 28 to 31 contains information pertinent to specific classes of interrupt conditions. Interrupts are requested only when any of the mask bits pertaining to the active conditions are set to 1. If the relevant mask bits are set to a 0, no interrupt is requested. The occurrence of interrupt conditions while masked by the adapter is not recorded, so interrupts may not be "pending" awaiting setting of their mask bit. Once an interrupt request reaches a processor module it is recorded as pending, even if masked by hardware on that module.

A masked interrupt does not normally affect the processing of control structures (other than the Interrupt Descriptor), and does not inhibit continuation of this processing if such continuation would have happened after the interrupt request. One exception is that continuation is inhibited if a previous interrupt remains unacknowledged and a subsequent condition occurs which could result in an ambiguous status report if the device operation were allowed to continue. Interrupts are never required when using the I/O control technique of the present invention, and all activity may be driven by indicators, but when interrupts are used they must be acknowledged in a timely manner. The field designated module number from bit numbers 24 to 27 is used to identify the specific module which is to be interrupted. The interrupt address at bit 16 to 23 forms a field which contains the interrupt request address on the specified module. When used on a system with the bus described in the previously mentioned application filed concurrently herewith, bits 16 to 27 are used as the control space address for a control transfer requesting the interrupt.

Whenever a command completes or there is an exception or any other situation occurs in which there is a status to report, an interrupt condition is created within the I/O adapter. Interrupt requests are generated only as a result of interrupt conditions if interrupts for the appropriate type of condition are enabled by the mask field in the Interrupt Descriptor. An interrupt request is illustrated in FIG. 3 where the I/O adapter module 22c sends an interrupt request to the central processor module 20b.

The Mailbox control structure 30 is better illustrated in FIG. 9. Each Mailbox is a 16 byte structure formed by four sequentially ascending aligned doublewords. The first doubleword is a Command/Status Doubleword 50a. The second doubleword in the control structure is an Interrupt Descriptor 58a with a 16 bit literal field in the low order word. The third doubleword 60 contains the doubleword aligned address of the operand (if any) of the Mailbox command. The fourth doubleword 62 is a miscellaneous field to hold command-dependent data.

A convention followed in FIGS. 9 10A and 10B, 11, 12 and 13 is that to the right hand side of each doubleword, its relative sequential address in the control structure is designated in hexadecimal code. The uppercase "H" following the code indicates hexadecimal notation.

In the Command/Status Doubleword 50a as shown in FIG. 9, the command byte is at bits 0 to 7 and is used to hold the command code. The high order byte at bits 8 to 15 of the command word is used to select subcommand functions of certain commands. The extended status byte at bits 16 to 23 is available for adapter-specific usage. Bits 31 and 30 of the basic status byte at bits 24 to 31 is used to record the status flags which have previously been described in conjunction with the Command/Status Descriptor. Bits 27 to 24 hold the command completion status which, in the case of a Mailbox, indicate an operation completed successfully, an illegal command code was specified, a command was rejected because it could not properly be executed with the adapter in its current state, a specification error in an operand field prevented successful completion, an invalid, nonexistent, or misaligned memory or control space address was specified, or a diagnostic failure.

The various command functions designated by the states of the signals in bits 0 to 7 of the Command/Status Doubleword 50a include command codes which cause no operation and results in an immediate "done" status. Another command code requests the report the module type, which causes the recipient module to set the miscellaneous doubleword 62 to reflect the adapter type and configuration. A variety of different arrangements can be devised for reporting the module type, however the format for the module type doubleword might advantageously include a description of the type of module, a description of the installed options or related configuration details of each particular module, information regarding the hardware functionality of the module, and information regarding the firmware functionality of the module.

Another command code relates to return the diagnostic status, which causes the recipient module to use the misce llaneous doubleword 62 to report details of the completion of adapter self-diagnosis. The format of the returned doubleword during return diagnostic status commands is module type dependent. A communication path between the module and the main memory can be tested during the execution of the return diagnostic status command by writing to and reading back from the miscellaneous doubleword 62. If communication with the main memory is not achieved, it is doubtful that the correct status can be returned, but the module should attempt to report status, including diagnostic failure.

Another command code is to create queue meaning a Queue Descriptor. The command code to create the Queue Descriptor causes the adapter to create a Queue for the Device number specified by the lower order byte of the 16 bit literal field in the Interrupt Descriptor 58a. The location of the Queue Descriptor for this device is specified by the address field 60. Creation of a Queue Descriptor causes an implicit Device Attention condition to be delivered to the Device associated with the newly created Queue Descriptor, so that the command contained in the newly created Queue Descriptor will be executed immediately following the completion of this command. The completion interrupt from the create queue command will be requested (if enabled by the mask bit at bit position 30 of the INTD 58a) after creating the queue and before executing the command in the Queue Descriptor. Issuing the create queue command will result in two interrupts if both the Mailbox and Queue Descriptor completion interrupts are enabled. The normal usage of this implicit Device Attention condition is to cause queue initialization by creating the Queue Descriptor with an "initialize queue" code in its command byte, or to cause no additional activity by creating the queue Descriptor with a no operation code in its command byte. This create queue command will generate a command reject exception if a Queue Descriptor for the specified device already exists.

An important advantage of this technique for creating Device queues is that, once the queue has been created using this Mailbox command, all subsequent communication with the device takes place through the allocated Queue Descriptor. This provides the ability for system software to allocate the Queue Descriptor anywhere within main memory, rather than having to utilize fixed address locations for device control, as on most prior art computer systems.

Another command function which may be coded into the command field of the Command/Status Doubleword 50a is that of "destroy queue". A destroy queue command causes the adapter to cease responding to Device Attention requests for the queue with the Device number specified by the low order byte of the literal field in doubleword 58a. Any internal pointers maintained by the adapter for ancillary structures associated with the Queue being destroyed are invalidated by this command. No accesses to main memory for any services related to this Queue will be made after execution of the destroy queue command, unless the queue is subsequently recreated. If no Queue Descriptor exists for the designated Device, this command functions as a no operation command. The destroy queue command will generate a command reject exception if the designated Queue Descriptor is neither halted nor idle.

Another command function which may be coded into the command field of the Command/Status Doubleword 50a is that of halt I/O. A halt I/O command function causes the adapter to halt all input/output functions in process on all Devices, to cease scanning all Device queues, and to cease reporting all ancillary status regarding all devices until released by subsequent Device Attention requests. The halt I/O command should only be used in circumstances in which it is necessary to immediately stop input/output activity to prevent corrupted data from being transferred. The halt I/O command generates an interrupt condition after all of the I/O activity has ceased.

A command to set queue polling rate is also defined by a code in the command byte of the Command/Status Doubleword 50a. The set queue polling rate command causes the adapter to set the time base value used for polling of idle Device queues to the value from the literal field of doubleword 58a. The 16 bit code in the literal field of the doubleword 58a specifies the minimum time which must elapse between polling queues for idle Devices associated with this I/O adapter to check whether new I/O Descriptors have been added to these Device queues. Each I/O adapter type has its own default polling rate, set internally after the system reset or module reset. The set queue polling rate command only needs to be used if system software wishes to change from the default rate. A value of 0 specifies no delay, and will cause the idle queues to be polled as frequently as the adapter is able to do so. Values greater than zero specify units of a system-defined timebase, which is 8 milliseconds in the preferred embodiment.

A last standard command function established by the code in the command byte of the Command/Status Doubleword 50a is that for run extended diagnostics. The run extended diagnostics command causes the recipient module to run additional internal diagnostics. Modules with self-diagnostic capability are known in this art. If a module does not have any extended diagnostic capability, it would reply to this command with an immediate "done" status. The run extended diagnostic command will generate a command reject exception if all I/O queues on this adapter are not idle. The extended diagnostics are specified in an adapter type-specific manner by the literal, address and/or miscellaneous fields included within the doublewords of the Mailbox. The preceding list specifies the standard commands which are supported by all adapters. Additional commands may be defined for specialized use by particular types of adapters. At least 32 command code values are reserved for Mailbox commands, with values 00H-1FH used in the preferred embodiment. All codes in this range which are not used by standard commands defined above are available for adapter specific usage.

The Queue Descriptor control structure 32 is illustrated in greater detail in FIGS. 10A and 10B. Each Queue Descriptor 32 is formed by eight sequentially ascending doublewords at aligned doubleword address boundaries in memory. Each Queue Descriptor is therefore a 32 byte structure which is created by commands sent to the adapter through its Mailbox. All I/O adapters must support Queue Descriptors 32.

Queue Descriptors hold the control information needed by the processors and the I/O adapters to maintain the I/O Descriptor Queue for each Device attached to the adapter. There is at most one Queue Descriptor for each Device attached to the adapter. Such Queue Descripters are created by Mailbox commands as discussed above. No I/O operations to a device are possible until a Queue Descriptor for that device has been created.

Processors request an I/O adapter to interrogate a particular Queue Descriptor by issuing the I/O adapter a Device Attention for the appropriate device. Processors must request Queue Descriptor re-interrogation whenever there is a need to perform new Queue Descriptor commands. Processors must also request Queue Descriptor re-interrogation when the processor changes certain control information in the Queue Descriptor, because I/O adapters are not required to re-check Queue Descriptor contents between processing of I/O Descriptors and the I/O adapters are permitted to retain Queue Descriptor information in private memories.

The first doubleword of the Queue Descriptor structure shown in FIG. 10A is a Command/Status Doubleword 50b. The Command/Status Doubleword 50b is essentially similar to that which has been described in conjunction with the Mailbox. However, one difference resides in bits 14 and 15 of the command modifier byte. Bit 15 is set to a "1" to indicate that the I/O Descriptor pointer in the next following doubleword 64 is valid. Whenever there are no I/O Descriptors on the Device queue, or when the queue head pointer is being updated by means of two 16 bit write operations by processors with 16 bit data paths, bit 15 must be set to "0" to prevent the adapter from using an invalid address from the doubleword 64. Bit 15 should never be changed from a "1" to a "0" while the adapter is processing the Queue Descriptor, as is indicated by the basic status bit 31 being set to a "1". Bit 14 is set to a "1" to cause the adapter to request a new interrupt as soon as the new interrupt condition occurs, without waiting for acknowledgment of a previous interrupt request.

The second doubleword at 64 contains a pointer to the first I/O Descriptor on this Device queue. This pointer is used for Queue management and is never modified by the adapter. The only circumstance that the doubleword 64 is read by the adapter is during execution of "initialize queue" (Mailbox) commands and when obtaining the initial I/O Descriptor pointer when polling an empty queue. The pointer at doubleword 64 is used by the adapter only if the IOD pointer valid flag at bit 15 of the Command/Status Doubleword 50b is set to a "1".

The third doubleword at 66 contains a pointer to the I/O Descriptor currently being processed by the adapter when the Device associated with this Queue is busy. Alternatively, the doubleword at 66 contains a pointer to the last I/O Descriptor processed by the adapter when the Device associated with this Queue is idle. The pointer at doubleword 66 may be read but must never be modified by operating system software. The adapter stores a copy of the current I/O Descriptor address into this doubleword at 66 whenever a valid I/O Descriptor is fetched from memory during the process of command chaining. During I/O operations, command chaining is the action by the adapter of proceeding to the next command for a particular Device upon completion of the previous command, without requiring intervention by any processor.

The fourth doubleword of the Queue Descriptor control structure is an Interrupt Descriptor 58b. The Interrupt Descriptor is contained in the high order word at bits 16 to 31. The low order bits at 0 to 15 are an interrupt status and acknowledgement field. The contents of the doubleword 58b are used to report, mask, identify and acknowledge all interrupts resulting from operation of the device associated with this Queue. This includes both normal completion conditions and exception conditions, and relates to execution of both Queue Descriptor commands and I/O Descriptor commands.

The interrupt status word of the Interrupt Descriptor 58b of the Queue Descriptor control structure 32 is used to communicate all interrupts related to Queue Descriptor commands and I/O Descriptor commands. The major characteristics of the interrupt reporting mechanism provided by the Interrupt Descriptor 58b are that all interrupt conditions may be masked, allowing interruptless operation if desired by the system software; that interrupt conditions may still be reported through the interrupt status word of the Interrupt Descriptor 58b when interrupts are masked; that each interrupt condition must be explicitly acknowledged by the software before a subsequent condition is reported, thereby assuring that no ambiguous status of a Device will be reported; and that the presence of a pending interrupt condition when a previous interrupt remains unacknowledged causes an indicator to be set and further processing to be suspended.

There is a distinction between an interrupt condition and an interrupt request under the present invention. Many adapter activities can generate interrupt conditions when they have status to report back to the software. These interrupt conditions always result in updating of the status information of several of the control structures of the present invention, including the Command/Status Doubleword of the control structure being processed when the condition occurred, the interrupt status word of the Queue Descriptor for the Device, the Exception Status Block if an exception is being reported, and the Status Update Summary (SUS) Indicator, if enabled by a Queue Descriptor command. Interrupt conditions result in an interrupt request to a processor if interrupts for the appropriate type of condition are enabled by the mask field shown at bits 28 to 31 of the Interrupt Descriptor 58b. Thus interrupt conditions result in interrupt requests only if the requests are not masked.

The high order word, bits 16 to 31 of the interrupt Descriptor 58b specifies the interrupt destination for exception, completion, program controlled interrupt (PCI), and end of chain interrupts, and provides independent mask bits for each of these types of interrupt conditions. All interrupts associated with a Device are routed to a single destination processor at the module specified by bits 24 to 27 of the Interrupt Descriptor 58b. Bits 16 to 23 identify the specific interrupt level at the designated destination processor. Information in the interrupt status word, i.e. the lower order word of Interrupt Descriptor 58b, allows the interrupt handler on this processor to distinguish between different types of interrupts. The Interrupt Descriptor is never written to by the adapter and is always read from main memory by the adapter before requesting an interrupt. Accordingly, the interrupt mask and address information may be changed by the processor at any time by writing a 16 bit value into the high order word of doubleword 58b.

The interrupt mask bits at bit locations 28 to 31 may be coded in any way desired. However, one particular arrangement is to set a "1" in bit 31 to enable exception interrupts which are generated by exceptional completion of Queue Descriptor commands, exceptional completion of I/O Descriptor commands, time outs of any command function, and Queue integrity violations during command chaining. Bit 30 may be set to a "1" to enable Queue Descriptor completion interrupts which are generated by the successful completion of Queue Descriptor commands. Bit 29 may be set to a "1" to enable PCI interrupts which are generated by completing the processing of I/O Descriptors with the command modifier bit 14 set to "1". Bit 28 may be set to a "1" to enable end of chain interrupts, which are generated when the device becomes idle after successful completion of the last I/O Descriptor in the queue. The end of chain condition is also generated when the device is halted after successful completion of an I/O Descriptor with bit 13 of its command modifier (stop chaining) set to a "1". At least one I/O Descriptor must have been processed before an end of chain condition can occur. Executing an initialize queue command for a Queue Descriptor with a null queue or a continue command with an invalid link pointer in the current I/O Descriptor does not generate an end of chain condition.

The interrupt status and acknowledgement field located at bit locations 0 to 15 of the doubleword 58b, also called the interrupt status word, contains information on the cause of the most recent interrupt condition from the Device and the current status of the Device queue processing. The low order byte of this word is also used by software to acknowledge interrupt conditions.

Information as to the cause of the most recent interrupt condition from the Device is contained in the low order byte of the interrupt status word. This low order byte is available for use by the interrupt handler in determining how to handle the interrupts it receives. The adapter stores interrupt type information into the interrupt status word immediately before requesting the interrupt, if the interrupt condition is enabled, or upon detecting the interrupt condition if the interrupt condition is masked. Usage of the bits in the interrupt type byte data include, for example, setting bit 7 to a "1" to indicate an exception condition as a result of execution of a Queue Descriptor command. Further status information is available in the status word of the Command/Status Doubleword of this Queue Descriptor. Bit 6 is set to a "1" to indicate the successful completion of a Queue Descriptor command. Bit 5 may be set to a "1" to indicate an exception condition as a result of the execution of an I/O Descriptor command. Further status information is available from the Command/Status Doubleword of the I/O Descriptor indicated by the current I/O Descriptor pointer 66 as well as in the Exception Status Block. Bit 4 may be set to a "1" to indicate the "end of a chain" condition, which means that either the last I/O Descriptor on the queue, or an I/O Descriptor with a stop chaining flag (command modifier bit 13) set, has been encountered. These two causes may be distinguished by testing the high order byte of the interrupt status word to determine whether the Device is idle (end of queue) or halted (chaining stopped).

Bit 3 in the interrupt type code may be set to a "1" to indicate that the time out interval specified in the Queue Descriptor (low order word of 52a, FIGS. 5 and 10B) has elapsed during the execution of the current command without either command completion or another exception condition. Bit 3 will be set along with bit 5, since time out is also an I/O Descriptor exception condition, and additional status information is available on the Exception Status Block. Bit 2 is set to a "1" to indicate that the I/O Descriptor just completed its PCI request bit (command modified bit 14) set to a "1". No additional status is relevant. The current I/O Descriptor pointer 66 may not be relied upon to locate the source of the PCI, since processing of that I/O Descriptor has been completed, and the current I/O Descriptor pointer value may have been updated before the interrupt request is received by the processor. However, due to the strictly sequential nature of queue processing by the adapter, the software which sets the PCI bits may track queue processing progress as PCIs are received. Bit 1 is set to a "1" to indicate that a queue integrity exception has occurred during command chaining, which means that either the Command/Status Doubleword of the I/O Descriptor was not in "pending" status, or that an I/O Descriptor link pointer contained a misaligned or a non-existent memory address. These two conditions may be distinguished by testing bit 3 of doubleword 0 of the Exception Status Block, as described below, which is set to a "1" to indicate an invalid I/O Descriptor link pointer. Bit 0 is not currently assigned and will always be set to 0.

I/O adapters may set more than one bit in the interrupt status byte of doubleword 58b if more than one condition relating to a single Device becomes active simultaneously. If an I/O adapter has multiple interrupt conditions which cannot be reported in this manner, the reporting priority is based on the order in which the bits are assigned in the interrupt type byte. The interrupt types assigned to higher order bits of this byte have a higher reporting priority.

The interrupt type byte also serves as an interrupt acknowledgement indicator to the adapter. When an interrupt condition for the device has been handled by the system software, the interrupt handler must clear the interrupt type byte to all zeros. The adapter will not request another interrupt for this Device, and will not store new type information for a masked interrupt condition, while the interrupt type byte is non-zero (unless an ignore interrupt acknowledgement bit (bit 14) in the command modifier byte of the Queue Descriptor's Control/Status Doubleword is set to a "1"). If acknowledgements are being ignored and interrupts are not masked, the interrupt type byte will always reflect the most recently requested interrupt, which may still be pending at the target processor.

The high order byte, bits 8 to 15, of the interrupt status word of the Interrupt Descriptor 58b are used to indicate the current state of Queue processing. This high order byte is never written to by processors. The adapter writes this byte asynchronously with the rest of the Queue Descriptor for updating pending interrupt status and device activity status. Bit 15 is set to a "1" by the adapter if an additional interrupt condition is pending and the previous interrupt condition has not been acknowledged. This bit is not used when the ignore interrupt acknowledgement bit (bit 14) in the Queue Descriptor's command modifier is set to a "1". After the adapter sets this bit at bit position 15 to a "1", further activity for this Device is inhibited until the interrupt condition is acknowledged to prevent loss of, or ambiguous reporting of, the status of the device. While waiting for interrupt acknowledgement with another interrupt condition pending, the adapter does not indicate an idle state, and polls the low order byte of the interrupt status word for interrupt acknowledgement. The new interrupt condition will be reported and the bit at location 15 set to "0", as soon as the previous condition is acknowledged. Any Device Attention request to a Device with an additional interrupt pending will result in the Queue Descriptor command being rejected with an immediate "done" indication and command reject completion status in the Queue Descriptor's basic status byte.

Bit 9 of the interrupt status word is set to a "1" by the adapter when the Device becomes idle and is set to a "0" when the queue polling (or a Device Attention) results in detection of a valid I/O Descriptor pointer at the link pointer where the previous chaining has ended. When the Device is idle the Queue Descriptor or I/O Descriptor command modifier whose bit 15 is being polled for a valid I/O Descriptor pointer may be located via the current I/O Descriptor pointer 66. Bit 8 is set to a "1" by the adapter when the Device is halted, as a result of a stop chaining request in an I/O Descriptor, a "halt device" Queue Descriptor command, a "halt I/O" Mailbox command, or an exception condition. Bit 8 is set to a "0" when the Device is restarted as a result of a "continue" or "initialize" Queue Descriptor command. Bits 8 and 9 will never both be set to a "1" simultaneously and when both of these bits are set to a "0" the device is active (processing I/O Descriptors).

The setting of bits 8 and 9 of the interrupt status word is not meaningful until after the execution of the first "initialize queue" command after creation of the Queue. These bits only reflect the activity status of the I/O Descriptor processing and are not updated as a result of Queue Descriptor command processing. Any attempts to poll for queued command completion using these bits must be qualified by first testing for a done status in the basic status byte of the Command/Status Doubleword 50b of this Queue Descriptor.

In the Queue Descriptor control structure 32 shown in FIG. 10B, the doublewords 52a and 52b contain an Extent Descriptor for the Exception Status Block. Whenever an exception condition is reported for this Device, the adapter stores exception status information into the Exception Status Block indicated by this Extent Descriptor. The Exception Status Block length is adapter type dependent, but might be required to be at least 16 bytes, as defined below. If the ESB length in the high order byte of 52a is zero, no exception status is requested. The lower order word of the doubleword 52a contains the time out value for this device. This field specifies the number of predetermined time intervals (current implementation uses 8 millisecond intervals) that must elapse after the adapter initiates any operation to this Device before the operation is terminated with the time out condition indicated as the completion status. The time out condition is treated as an exception condition for the purposes of interrupt requests, with an additional bit in the interrupt type byte to distinguish time outs from other forms of exceptions. A time out value of 0 inhibits the time out function.

The doubleword 72 is available for adapter specific usage by any adapter types which require additional information in the Queue Descriptor. The doubleword 74 is a miscellaneous field for command-dependent data.

The Device-level command codes of each Queue Descriptor 32 are contained in command byte (bits 0 to 7) of the Command/Status Doubleword 50b (FIG. 10A). The Device level command codes must be implemented by all I/O adapters unless indicated otherwise.

One Device level command code causes no operation, but does cause the adapter to re-read the values of doublewords 52a, 52b, 72 and 74 into private memory. The "no operation" command is useful when it is necessary to change the timeout value, the Exception Status Block location, or miscellaneous information when the Queue does not need to be re-initialized. Execution of this command results in an immediate "done" status and a completion interrupt condition.

Another Device level command code present at the command byte of the Command/Status Doubleword 50b is one to "initialize queue", which causes the adapter to store the address of the Queue Descriptor into the current I/O Descriptor pointer of the doubleword 66, read the values of doublewords 52a, 52b, 72 and 74 of the Queue Descriptor into its private memory, become active (if halted), and initiate queue polling at the queue head pointer in the doubleword 64.

With respect to the "initialize queue" Device level command, if bit 15 of the Command/Status Doubleword 50b is set to a "1" to indicate that the I/O Descriptor Queue head pointer 64 is valid, the adapter stores a copy of this pointer into the current I/O Descriptor pointer at doubleword 66 and begins processing the designated I/O Descriptor. If bit 15 of the Command/Status Doubleword 50b is set to a "0" to indicate that the I/O Descriptor Queue head pointer 64 is not valid, the adapter treats this Device as being idle, and commences Queue polling with bit 15 of the Command/Status Doubleword 50b being periodically tested. In this case the idle bit (bit 9) of the extended interrupt status byte of doubleword 58b is set to a "1" when a "done" status is returned at the end of the "initialize queue" command. If a Queue Descriptor is initialized with a null Queue (bit 15 of the Command/Status Doubleword 50b is set to a "0") the system software may place the first I/O Descriptor into this Queue by storing its address into the doubleword 64 and then setting bit 15 of the command status doubleword 50b to a "1".

Execution of the "initialize queue" command results in an immediate "done" status and a completion interrupt condition. There will be a subsequent end of I/O Descriptor chain completion interrupt condition when the end of the I/O Descriptor is changed. This command generates a command reject exception if executed when the Device is neither halted nor idle.

Another device level command code at the Command/Status Doubleword 50b is to "halt Device", which causes the adapter to halt any I/O operation in progress on the Device and to cease scanning the I/O Descriptor Queue until released by a subsequent continue command. The "halt Device" command generates a completion interrupt condition when I/O activity has been halted. If an I/O Descriptor operation is in progress when this command is executed, the operation is terminated with exception status indicating that a halt I/O occurred. If the device is idle, the "halt Device" command halts Queue polling with no exception condition. If the Device is already halted, the "halt Device" command has no effect.

A "continue" command is also one of the Device level commands available at the Queue Descriptor Command/Status Doubleword 50b. The "continue" command causes the adapter to resume processing the I/0 Descriptor Queue at the next pointer in the I/O Descriptor designated by the doubleword 66. If this pointer is flagged as not valid, the adapter polls its validity indicator until a valid pointer is available. The "continue" command is used to restart I/O operation after an end of chain condition, exception condition, halt device (QD) command, or halt I/O (MB) command. Note that the continuation occurs with the I/O Descriptor following the I/O Descriptor at which the idle, exception or halt occurred. Execution of this continue command results in immediate "done" status and a completion interrupt condition. There will be a subsequent end of I/O Descriptor chain completion interrupt condition when the end of the I/O Descriptor chain is reached.

Another Device level command available at the Command/Status Doubleword 50b is to "load statistics pointer". The "load statistics pointer" command causes the adapter to read the contents of the doubleword 74 for use as a pointer to a buffer memory in which to store Device activity statistics. The specific statistics maintain, and the format of the statistics reporting buffer, are adapter type-specific. Only adapter types which implement I/O statistics gathering need to implement this command. The statistics pointer is set invalid by both the create queue (MB) command and the destroy queue (MB) command. Statistics gathering upon queue creation is inhibited until enabled by this command. Writing to a former statistics buffer after the Queue no longer exists is also prevented. Once statistics gathering is enabled by execution of this command, it may not be disabled other than by destroying the Queue. The "load statistics pointer command" generates a command reject exception if executed on an I/O adapter which does not support statistics gathering.

A last significant Device level command available from the Command/Status Doubleword 50b is that of "load status update summary pointer". The "load SUS pointer command" causes the adapter to read the contents of the doubleword 74 for use as a pointer to the doubleword of which the low order byte is the SUS indicator. The SUS indicator is set non-0 immediately after the adapter updates the basic status byte of any Command/Status Doubleword associated with this device (QD or IOD) to "done" status. The SUS indicator is set non-zero for any condition which results in "done" status, including both normal completions and exception conditions. All adapters implement this command. The SUS pointer is set invalid by both the create queue (MB) command and the destroy queue (MB) command. SUS reporting upon the Queue creation is inhibited until it is enabled by this command. Also prevented is the writing to a former SUS indicator after the Queue no longer exists. Once SUS reporting is enabled by execution of this command it may not be disabled other than by destroying the Queue. More than one SUS pointer may point to the same doubleword, since the SUS indicator is updated without regard to the previous state of the indicator.

The I/O Descriptor 34 is shown in greater detail in FIG. 11. Each I/O Descriptor contains the basic control information for a single Device level operation. An I/O Descriptor, along with its ancillary Transfer Control List 38 and Device Control Block 36 structures (FIG. 2) fully specify an input/output operation to both the adapter and to the external Device controller (if present). Each I/O Descriptor is constructed by system software and linked onto the Device Queue for the appropriate Device. I/O adapters obtain access to the I/O Descriptors through the command chaining process, perform the indicated operations, and report completion status to the status fields of the I/O Descriptors. All I/O adapters must support I/O Descriptors.

I/O Descriptors 34 are eight doublewords in sequentially ascending aligned doubleword locations in memory.

The first doubleword of the I/O Descriptor 34 is a Command/Status Doubleword 50c. The command byte at bits 0 to 7 is used to hold Device-specific command codes. The codes can be specific to any particular adapter; however, the codes and reserved ranges for read (40H–4FH), write (50H–5FH), Device control functions (seek, etc.) (60H–6FH) and others (70H–7FH) are incorporated.

The command modifier byte at bits 8 to 15 indicates actions for the adapter to take during the processing of the command in this I/O Descriptor. The Queue control functions include bit 15 which is set to a "1" to indicate that the next I/O Descriptor pointer (doubleword 76) contains a valid I/O Descriptor address; bit 14 which is set to a "1" to cause the PCI interrupt condition when processing of this I/O Descriptor is completed; bit 13, which is set to "1" to force command chaining to stop and this device to halt, with end of chain status, independent of the value or validity of the next I/O Descriptor pointer 76; bit 12, which is set to a "1" to force command chaining to continue even if this I/O Descriptor generates exception status (only intended for use by device diagnostic software, which must sometimes knowingly generate exception conditions); and bit 11, which is set to a "1" to cause the adapter to use doublewords 52c and 52d as an Extent Descriptor of the physical I/O buffer rather than as an Extent Descriptor of the Transfer Control List. Data linking is not possible when bit 11 is set to a "1". Data linking is the action by an adapter of proceeding to the next data buffer for the purpose of continuing the data transfer associated with a single command upon exhaustion of the byte count of the previous data buffer. Bits 12 and 13 are mutually exclusive with respect to one another.

The Device specific status byte at bit 16 to 23 of the Command/Status Doubleword 50c of the I/O Descriptor 34 is available for reporting Device specific or adapter specific completion status concerning the command.

The basic status byte at bits 24 to 31 of the Command/Status Doubleword 50c is used to report on the processing and completion of the I/O command. Bits 30 and 31 are the I/O status flags which have previously been described in conjunction with the Control/Status Doubleword. Some types of adapters may utilize more than one I/O Descriptor in processing a single logical operation. In this case only the first I/O Descriptor must be marked busy at the beginning of the operation since the link pointer in a busy I/O Descriptor may not be modified by software, thereby guaranteeing that the next I/O Descriptor will still be available when needed. Bit 29 is set to a "1" when the "done" status is stored into this byte if the adapter is generating an interrupt condition as a result of this I/O Descriptor, independent of the state of the interrupt mask in the Queue Descriptor. Bit 28 is set to a "1" to indicate that this command has been completed with exception status and that details on the exception may be found in the Exception Status Block for this Queue. Bits 27 to 24 hold the command completion status encoded to indicate that an operation completed successfully, an illegal command code was specified, the command was rejected because it could not be properly executed with the adapter in its current state, a specification error in an operand field prevented successful completion, an invalid or nonexistent or misaligned memory or control space address was specified, an uncorrectable data error or other internal fault was detected within the I/O adapter, an uncorrectable data error on the external I/O adapter interface occurred during the operation, the command function was rejected by an external I/O controller, the minimum required data buffer space for the operation requested was not available, the operation did not complete within the time out interval specified in the Queue Descriptor, the operation was terminated due to a "halt I/O" Mailbox command, the operation was terminated due to a "halt device" Queue Descriptor command and others including diagnostic failure and various device-specific conditions.

Doubleword 76 is the link pointer for the I/O Descriptor queue. This pointer contains the address of the next I/O Descriptor for the adapter to process. This doubleword is never written to by the adapter and is only read and used by the adapter if the IOD pointer valid flag (bit 15) of the command modifier is set to a "1".

Doublewords 52c and 52d contain an Extent Descriptor for the Transfer Control List if bit 11 of the command modifier is set to a "0", or an Extent Descriptor for the data buffer if bit 11 of the command modifier is set to a "1". A valid entry in this Extent Descriptor is mandatory if the command requires a data buffer. If the Extent Descriptor specifies a Transfer Control List, the length value must be a multiple of 8 due to the (8-byte) length of Transfer Control List entires, and the address must be a multiple of four since the control structures of the present invention must be doubleword aligned. If this Extent Descriptor specifies the data buffer directly there are no length nor alignment restrictions. In the special case of commands which can never require more than four bytes to be transferred, doubleword 52d may be used as a data buffer in lieu of a Transfer Control List or single designated buffer.

Doublewords 52e and 52f contain an Extent Descriptor for the Device Control Block. The length of the Device Control Block may be variable, although the start address of the Device Control Block must be doubleword aligned. A Device Control Block must be present if the command requires ancillary control information. If a Device Control Block is optional for a particular command, its presence may be detected by a non-zero value in the Device Control Block length field of the Extent Descriptor 52e. In the special case of commands which require ancillary information, but which can never require more than four bytes of ancillary information, doubleword 52f may be used to hold this control information in lieu of a Device Control Block.

Doublewords 78 and 80 are available for adapter specific usage with types of Devices which require additional functionality in their I/O Descripters. Possible uses of doublewords 78 and 80 include device related control or status information of a type which does not justify allocating a Device Control Block or a special status buffer. An example is to report data link and network level status for a local area network interface.

The Device Control Blocks 36 (FIGS. 2 and 5) provide aligned doubleword memory location space to store device specific control information in support of I/O Descriptor commands. As such, the Device Control Blocks are not specifically illustrated. The size and format of the Device Control Block is totally adapter dependent, and is not constrained to be uniform between adapter types. Device Control Blocks should be used only for adapter functions which cannot fit their Device specific control information into the I/O Descriptor. An example is to store SCSI (ANSI X3T9.2 standard) command blocks in Data Control Blocks used with SCSI disk control I/O Descriptors.

Details of a Transfer Control List 38 are shown in FIG. 12. A Transfer Control List 38 provides access to one or more data buffers for use in transferring the data associated with a single I/O Descriptor. The Transfer Control List is a list of Extent Descriptors, each of which define a separate I/O buffer. The format of the Transfer Control List places no restrictions on length or on the alignment of these buffers. The low order word of each Extent Descriptor doubleword 52g of the Transfer Control List control structure 38 is reserved for possible use in holding a command or buffer usage indicator. An example of the use of this lower order word would be to distinguish buffers holding keys from buffers to accept read data or to provide write data for an intelligent data base processor. The number of Extent Descriptors in the Transfer Control List is not limited, and may extend beyond the Extent Descriptor 52g and 52h illustrated in FIG. 9. All Extent Descriptors in a given Transfer Control List must be at sequentially ascending addresses.

Details of the Exception Status Block 40 are illustrated in FIG. 13. Each Exception Status Block 40 provides space for storing status information concerning exception conditions which occurred while performing Device level commands. There is an Exception Status Block associated with each Queue Descriptor, as is shown in FIGS. 2 and 5, and command chaining is generally stopped when an exception occurs to permit inspection of the Exception Status Block contents and initiation of error recovery activity (if necessary). The Exception Status Block is a variable length structure containing four or more sequentially ascending doublewords aligned at doubleword boundaries in memory.

The doubleword 86 of the Exception Status Block 40 contains completion status information in the low order word and the residual transfer count in the high order word. The basic status byte contains bits which indicate the type of exception which occurred. Bit 3 is set to a "1" to indicate that an invalid I/O Descriptor link pointer was encountered during command chaining. Bit 2 is set to a "1" to indicate that the exception was detected by error status presented by the external interface. Bit 1 is set to a "1" to indicate that the Transfer Control List pointer in doubleword 92 of the Exception Status Block contains meaningful information. Bit 0 is set to a "1" to indicate that a direct memory access (DMA) transfer (reading or writing an I/O buffer) was in progress when the exception occurred, meaning that the high order word of this doubleword as well as the doubleword 88 of this Exception Status Block contain meaningful information. The Device specific status byte at bits 8 to 15 contains additional information regarding the exception. The residual direct memory access transfer count field at bits 16 to 31 contains the number of bytes remaining to be transferred in the I/O buffer when the exception occurred. This value is only meaningful if bit 0 of this doubleword is set to "1".

Doubleword 88 contains the memory space address which would have been used on the next DMA transfer cycle if the exception had not occurred. This value is only meaningful if bit 0 of doubleword 86 is set to a "1".

Doubleword 90 contains the address of the I/O Descriptor which was being processed when the exception occurred. This value is only meaningful if bit 3 of doubleword 86 is set to a "0". Doubleword 92 contains an address 8 bytes higher than the Transfer Control List entry which was being used when the exception occurred. This value is only meaningful if bit 1 of doubleword 86 is set to a "1".

Doubleword 94 and additional doublewords (not shown) are available if needed to hold information specific to the particular type of adapter, Device, and/or error.

The typical computer system utilizing the present invention will have a plurality of I/O devices attached to the I/O adapters. Management of these devices from system software can involve considerable overhead accessing multiple control structures scattered throughout main memory. Accordingly, the present invention provides the status update summary facility for rapid determination that control structures need to be inspected. A Status Update Summary (SUS) Indicator 95, shown in FIG. 5, may be set whenever any device related status (either normal or exceptional) in main memory is updated by the adapter. The top level of the system I/O management software may use the status update summary indicator to control entry to various lower levels of device driver software. Instead of using an interrupt to determine whether the status of any of the devices has changed, or examining the various areas of memory checking status, both of which require considerable overhead, the status update summary indicator can be examined.

The Status Update Summary Indicator 95, shown in FIG. 5, is a doubleword memory location in which the update indicator is placed. One Status Update Summary Indicator may be associated with each Queue Descriptor 32. Each Queue Descriptor 32 can be set with a Status Update Summary pointer, using a "load status summary update pointer" command which uses the Queue Descriptor miscellaneous doubleword 74 (FIG. 10B) to specify the Status Update Summary Indicator address in memory. Whenever the I/O adapter makes any change to any Command/Status Doubleword which results in a "done" status, with either normal completion or exception completion, the location specified by this pointer will be updated by being set nonzero at the same time as the adapter sets the "done" status into the Command/Status Doubleword. By looking at one Status Update Summary Indicator location, the software can determine if any status related to any given Queue Descriptor has been updated. This saves considerable overhead and time in determining changes in status. If the total number of active device queues is small it may be even more efficient to have more than one Queue Descriptor use the same SUS indicator.

From the foregoing description, it is apparent that there is a considerable amount of uniformity between these control structures. Many of the doublewords within each control structure are of the same type. This uniformity enhances the utility of the present invention in different types of computer systems and for communication with different types of I/O devices. The input/output control technique of the present invention is applicable to a wide variety of different I/O Devices, without the necessity for devising separate adapter processors or writing specific device driver codes for specific types of different I/O devices or adapters.

The function of the present invention can now be better understood in view of the control structures described. Software or firmware running on the processor modules will begin by placing information into the Mailboxes at the fixed addresses. The processors will then issue Module Attention signals. A "create queue" command from the Mailbox will be sent to each adapter for each attached device. Sofware or firmware on the central processor will build the Queue Descriptors. Each module which receives a "create queue" (Mailbox) command will store in its internal memory the address of its Queue Descriptor. Subsequently, when the adapter receives a Device Attention signal for that device, it will be able to locate the Queue Descriptor. Once each Queue Descriptor is created, it will remain until a "destroy queue" (Mailbox) command is issued. Similarly, whenever software running on the processor needs to accomplish an I/O operation, it will normally create an I/O Descriptor (or re-use a previously completed I/O Descriptor) to describe the operation and then enqueue it onto the Queue for the appropriate Device. Ultimately the Device will examine the queue during normal polling or as a result of a Device Attention signal.

The input/output operation will then be accomplished as a result of the information contained within the I/O Descriptor, and possibly by the use of the Transfer Control List and Device Control Blocks. Response to the completion, either successful or with exception, of the I/O operation will cause the I/O adapter to modify the status fields within all appropriate control structures (and the entire contents of the Exception Status Block in the case of an exception condition). At some later point in time the processor checks the completion status of the appropriate I/O Descriptor to determine if the I/O operation has been completed. This check only needs to be made if the Status Update Summary Indicator indicates a changed condition. The processor can continue and use the information without having ever been interrupted, resulting in a substantial savings of time and increasing the data throughput of the overall system. If it is determined as a result of the examination of the completion status of the appropriate control structure that the particular I/O operation has not been completed, the processor can wait until it is completed, and can do other processing before rechecking the completion status.

One of the important advantages available from the present invention is that the I/O adapters need not be I/O processors. Accordingly, the central processors retain control over the operating system, and the difficulties in the prior art of attempting to utilize I/O processors to execute a portion of the operating system code are avoided. The preferred means of implementing the I/O adapter is in micro code on a common bipolar micro sequencer. However, the function of the I/O adapter could also be implemented in hardware or in software. Sequencers are known in the art, and the functions to be achieved by an I/O adapter are within the capability of one skilled in the art. It is significant from an implementation point of view that support for this I/O control technique does not require the I/O adapter to have a general purpose arithmetic/logic unit (ALU), only bit testing and address increment/decrement capabilities are required. The following state transition diagram shown in FIG. 14 exemplifies use for one device connected to one of the I/O adapter modules. As is discussed in conjunction with FIGS. 3 and 4, more than one device can be connected to a physical I/O adapter module.

One state transition diagram for the operation of the present invention and one device connected to the I/O adapter shown in FIG. 14. A power on reset establishes a null condition or state at 100. The transition from the null state is as a result of a Mailbox command which is executed in response to a Module Attention based on a command code in the Mailbox Command/Status Doubleword. One transition is to create a queue and the other transition is to destroy the queue. The create queue transition establishes a not initialized state of 102. The destroy queue transition goes from the not initialized state 102 to the null state 100. A Queue Descriptor command to initialize the Queue is the transition between the not initialized state and a poll request state 104. In the poll request state a timing condition is established by which to periodically poll the Queue. Polling the Queue means monitoring bit 15 of the command modifier byte of the Queue Descriptor or the last I/O Descriptor completed, testing for this bit being set to "1". If the Queue is polled and this bit is found to be "0", the Queue is empty; and under such conditions a transition from the poll request state 104 is made to a state designated Device idle 106. The transition from the Device idle state 106 to the poll request state 104 is labeled "timer or queue descriptor continue". The "timer" label in this transition means that the timer polling rate has timed out and it is time to poll the Queue again. The time duration of the timer is set by the "set queue polling rate" command. The label "queue descriptor continue" means that a Device Attention signal has been sent with a Queue Descriptor command of "continue", meaning that the device should proceed with polling.

If the polling in the poll request state determines that the Queue is not empty, a transition from the poll request state 104 occurs to a channel request state 108. In the channel request state 108, a request is made to attempt to activate a communications channel to the specific external physical device from the I/O adapter. A transition from the channel request state 108 to a channel use state 110 occurs as a result of the successful activation of this channel. If the allocation of a channel fails, there is a transition from the channel use state 110 back to the channel request state 108.

The channel use state 110 is the channel used to perform the I/O operation. If during the process of using the channel, a disconnect occurs, meaning that there are no functions occurring on the channel and the channel may be free, the disconnect transition occurs to a channel disconnect state 112. A transition from the channel disconnect state 112 to the channel use state 110 occurs when the channel reconnects. An example of this is a disk drive, which may disconnect from the channel while a seek is in progress and reconnect when its heads are positioned over the desired cylinder.

When the use of the channel is completed, a transition from the channel use state 110 occurs to a poll interrupt state 114. Whenever a command completes or there is an execution of any of the number of other things described previously in conjunction with the interrupts, an interrupt condition occurs. The result of the interrupt condition may be to do nothing or to present an interrupt request. The result depends upon how the interrupt mask field is coded in the Queue Descriptor. If there is a reason to present an interrupt, there will be a transition loop on state 114 until the last interrupt has been acknowledged. The transition loop is designated "last interrupt unacknowledged". If there is no need for an interrupt condition to actually present an interrupt request, or if the preceding interrupt has been acknowledged, this transition from the poll interrupt state 114 is labeled "last interrupt acknowledged". In the last interrupt acknowledged transitions, there is a transition from the poll interrupt state 114 back to the poll request state 104.

Transitions from the Device idle state 106, poll request state 104, channel request state 108, channel disconnect state 112, and the poll interrupt state 114 occur to a Device halt state 116. The conditions which cause a device halt are a stop chaining flag within an I/O Descriptor, or a Queue Descriptor command "halt evice", a Mailbox command "halt I/O", any exception condition while processing the Queue Descriptor or the I/O Descriptor, or an operation timeout. Any of these situations cause the Device halt state to be entered. A transition from the Device halt state 116 back to the poll request state 104 can be accomplished as a result of a Queue Descriptor "continue" command or "initialize queue" command. A transition to the null state is accomplished with a "destroy queue" command at the Mailbox. Support functions such as the set queue polling rate (MB) or set SUS pointer (QD) commands are handled within states 100 and 102 as appropriate. Diagnostic functions are not shown in FIG. 14.

Some Devices connected to an I/O adapter are relatively simple in their operation, and do not require all of the states illustrated in the state transition diagram of FIG. 14. However, regardless of the simplicity of a particular Device, the null state 100, the not initialized state 102, poll request state 104, device idle state 106, poll interrupt state 114, and the Device halt state 116 are common to all types of devices. What will differ from one kind of Device to another kind of Device is the lower three states 108, 110 and 112. In a highly complex Device, the state 110 may be replaced by many additional states depending upon the particular requirements of the type of Device connected to the I/O adapter. In very simple Devices, a direct transition from the poll request state 104 to the poll interrupt state 114 will occur, thereby eliminating the states 108, 110 and 112. Further description of the various states is not considered necessary, because such states are Device dependent.

An explanation of certain additional operational sequences from the viewpoint of both the processor software or firmware and the adapter microcode or implementation means completes an understanding of the present invention.

Immediately after power on reset, the system firmware or software should, in the order identified, (a) issue a report module type command to each module, (b) issue a return diagnostic status command to each module determined to be an I/O adapter or processor, and (c) build system configuration information based on the type and condition of the modules queried. Upon receipt of the Module Attentions sent for the report module type and return diagnostic status commands, the recipient processor or adapter should read the designated Mailbox and perform the command functions previously described. Before performing any I/O operations to an adapter, at least one Queue Descriptor must be created and initialized.

Upon detection of a Module Attention, the recipient module should, in the order listed, (a) calculate or establish the address of the designated Mailbox of the module dependent upon the Mailbox address arrangement fixed in the system, (b) read the Command/Status Doubleword of the designated Mailbox and ensure that byte 3 indicates "pending" status, (c) write to byte 3 of the Command/Status Doubleword to set "busy" status, (d) decode the command specified in byte 0 of the Command/Status Doubleword, (e) execute the command if it is a valid Mailbox command, or otherwise report exception status upon completion, (f) write completion status information, along with "done" status, into byte 3 of the command status doubleword; and (g) request the interrupt specified in the Interrupt Descriptor if the mask bit (bit 30) of the Interrupt Descriptor is set to a "1".

Upon detection of a Device Attention, the recipient I/O adapter should, in the order listed, (a) retrieve the Queue Descriptor address for the designated Device; (b) check if the designated Device has a Queue created and ignore the Device Attention if there is no Queue; (c) if there is a Queue read the Queue Descriptor Command/Status Doubleword; (d) generate a queue integrity exception if byte 3 of the Command/Status Doubleword does not indicate "pending" status; (e) write to byte 3 of the Command/Status Doubleword to set "busy" status; (f) decode the command specified in byte 0 of the Command/Status Doubleword; (g) execute the command if it is a valid Queue Descriptor command, otherwise report exception status upon completion; (h) write completion status information, along with "done" status into byte 3 of the Command/Status Doubleword; (i) write interrupt status information into byte 0 of the interrupt status word, unless a previous interrupt remains unacknowledged and interrupt acknowledge is not inhibited; and (j) request the interrupt specified by the Interrupt Descriptor if the Interrupt mask bit in the Interrupt Descriptor for the appropriate interrupt type (completion or exception) is set to "1".

Upon receipt of an interrupt due to an interrupt request from an I/O adapter which has been issued a Mailbox command, the recipient processor should interrogate the completion status in the Mailbox Command/Status Doubleword status word. Upon receipt of an interrupt due to an interrupt request from an I/O adapter which has been issued a Queue Descriptor command or has been processing a Device Queue, the recipient processor should, in the order listed, (a) interrogate byte 0 of the interrupt status word in the appropriate Queue Descriptor to determine the type of interrupt which has occurred and the general conditions under which it occurred; (b) obtain additional information on the cause of the interrupt from the status of the Command/Status Doubleword of the I/O Descriptor which was being processed when the interrupt condition occurred (not relevant for Queue Descriptor command related interrupts), which can be found via the current I/O Descriptor pointer in the Queue Descriptor (only for completion, exception, and time out interrupts - PCI interrupts must be tracked by the software); (c) obtain exception details from the Exception Status Block if the interrupt type was exception; (d) perform whatever continuation, logging and/or recovery activi ties which are appropriate for this type of interrupt condition; and (e) acknowledge the interrupt by clearing byte 0 of the interrupt status word of the Queue Descriptor (unless interrupt acknowledgement is being ignored).

The integrity of the I/O Descriptor Queue linkage must be maintained at all times. Queue management is only performed by processors, and never by adapters. The functions of queue management must therefore be implemented in software or firmware. To add new I/O Descriptors to the end of the Queue, it is necessary to, in the order listed, (a) set the I/O Descriptor pointer valid bit in the new I/O Descriptor to "0"; (b) set the next I/O Descriptor pointer in the last I/O Descriptor on the Queue to point to the new I/O descripter; and (c) set the I/O Descriptor pointer valid bit in what had been the last I/O Descriptor on the Queue to a "1".

If the queue management software needs to force immediate processing in the new I/O Descriptor when the Device is idle, the software may issue a Device Attention with a "continue" command in the Queue Descriptor. To avoid unnecessary Device Attention requests, the software may determine if the Device is idle by testing the idle bit (bit 9) in the extended interrupt status byte of the Queue Descriptor. The relative positions of the I/O Descriptor pointer valid bit (bit 15 of the command modifier) and the head/next I/O Descriptor pointer doubleword in the Queue Descriptor and in the I/O Descriptor are identical. The handling of adding an I/O Descriptor to an empty Queue is identical to adding an I/O Descriptor to the end of a Queue once the address of the appropriate control structure (Queue Descriptor or I/O Descriptor) is obtained.

To add a new I/O Descriptor to the middle of a Queue, it is necessary to, in the order listed, (a) set the I/O Descriptor pointer valid bit in the I/O Descriptor after which the insertion is to occur (hereinafter called the "preceding I/O Descriptor") to "0" (changing this bit, as part of this sequence, is allowable even if the I/O Descriptor is "busy"); (b) test the I/O Descriptor status flags of the preceding 1/0 Descriptor for "available" or "pending" status, since if the status is "busy" or "done" the insertion cannot be made at this point in the Queue; (c) if the I/O Descriptor status flags indicate "busy" or "done", restore the I/O Descriptor pointer valid bit to "1" and terminate this activity (the new I/O Descriptor cannot be added at this point in the Queue); (d) set the next I/O Descriptor pointer in the new I/O Descriptor to the value of the next I/O Descriptor pointer from the preceding I/O Descriptor and set the I/O Descriptor pointer valid bit in the new I/O Descriptor to "1"; (e) set the next I/O Descriptor pointer in the preceding I/O Descriptor to point to the new I/O Descriptor; and (f) set the I/O Descriptor pointer valid bit in the preceding I/O Descriptor to "1".

To remove completed I/O Descriptors from the beginning of the queue, it is necessary to, in the order listed, (a) ensure that the first I/O Descriptor is done by testing bits 31 and 30 of its Command/Status Doubleword; (b) set the I/O Descriptor pointer valid bit in the Command/Status Doubleword of the Queue Descriptor to 0 (only necessary if there is a possibility that there is an "initialize queue" command in progress for the device); (c) copy the next I/O Descriptor pointer value from the first I/O Descriptor on the Queue into the Queue head pointer of the Queue Descriptor; and (d) set the I/O Descriptor pointer valid bit in the Command/Status Doubleword of hhe Queue Descriptor to "1" (only necessary if this bit was set to 0 earlier in this sequence).

To remove the last I/O Descriptor from a Queue, and thereby cause the Queue to become empty, it is necessary to use a Queue Descriptor command. If no new I/O Descriptors are available and Queue polling is to be halted, the "halt device" command may be used prior to removing the last I/O Descriptor from the Queue. If one or more new I/O Descriptors are to be substituted for the last I/O Descriptor, or if polling of the empty Queue is desired, the "initialize queue" command should be used. Prior to issuing an "initialize queue" command under these conditions it is necessary to, in the order listed, (a) set the I/O Descriptor Queue head pointer to the new I/O Descriptor, (b) set the I/O Descriptor pointer valid bit to "1" in the Command/Status Doubleword of the Queue Descriptor if a new I/O Descriptor was specified in the previous step, and otherwise set this bit to 0; (c) set the Queue Descriptor basic command byte to indicate an "initialize queue" command; and (d) perform a Device Attention to the appropriate Device address on the appropriate module. This procedure may be used to remove all enqueued I/O Descriptors from an idle Queue independent of the number of such I/O Descriptors.

The adapter must implement the Queue usage, since Queue usage is a responsibility of the adapters. This is to be distinguished from Queue management, which is the responsibility of the processors, since I/O Descriptors are used to communicate from processors to I/O adapters.

In order to poll an idle Queue, it is necessary to, in the order listed, (a) wait for expiration of the Queue polling rate counter; (b) test the state of the I/O Descriptor pointer valid bit in the Command/Status Doubleword of the last control structure processed when the Queue became idle; and (c) if the I/O Descriptor pointer valid bit is set to "0", return to step (a) of this sequence, or (d) if the I/O Descriptor pointer valid bit is set to a "1", use the doubleword immediately following the Command/Status Doubleword as a pointer to an I/O Descriptor and follow the procedure explained in the next paragraph below.

To chain to a new I/O Descriptor from either a Queue Descriptor or an I/O Descriptor it is necessary to, in the order listed, (a) wait for the I/O Descriptor pointer valid bit in the Command/Status Doubleword of the control structure being chained from to be set to a "1", following the polling procedure explained in the preceding paragraph if this bit is set to a "0"; (b) read the pointer value in the doubleword immediately following the Command/Status Doubleword in the control structure being chained from; (c) save the I/O Descriptor pointer in private memory or registers; (d) store the I/O Descriptor pointer value in the current I/O Descriptor pointer doubleword of the Queue Descriptor of this Device; (e) read the Command/Status Doubleword at the address designated by the pointer; (f) generate a queue integrity exception if byte 3 of the Command/Status Doubleword does not indicate "pending" status; (g) write to byte 3 of the Command/Status doubleword to set "busy" status; and (h) decode the command specified in byte 0 of the Command/Status Doubleword.

Data linking requires considerably less overhead in the I/O adapter than does command chaining. If a sequence of related data transfers can be done using a single command with data linking, this technique is more efficient than a sequence of chained commands with one buffer each.

When an adapter detects an error condition during device operation, command processing for the device is generally stopped. The existence of an error condition can be created by the exception status indicator in the I/O Descriptor, and/or the occurrence of an interrupt with exception status indicated in the interrupt status byte of the Queue Descriptor (if exception interrupts are enabled). When the processor becomes aware of the occurrence of an error it should inspect the completion status and the device specific status in the I/O Descriptor, inspect the interrupt status in the Queue Descriptor, and inspect the exception status in the Exception Status Block. Based on this information the software should be able to determine the type of problem and the necessary steps for recovery. Once this has been accomplished the software should either allow Device processing to resume with the I/O Descriptor after the one which generated the exception by issuing a "continue" Queue Descriptor command, rebuild the device Queue and restart processing at the beginning of the Queue by issuing an "initialize queue" Queue Descriptor command, or leave processing halted if the problem is not recoverable.

There is an architectural significance to separating the levels of the multilevel control structure of the present invention, and this significance creates advantages in the use of the present invention. Increased power in the form of expressive power, flexibility, or ability to adapt to different conditions, etc., is increased in direct relationship to the amount of indirection that is possible. Indirection in this sense means the ability to redirect the target operands or data or whatever is being operated upon. The multilevel structure of the present invention provides at least four levels at which this indirection can be advantageously applied, as is shown by the four levels in FIG. 2. In general terms, therefore, there is increased expressive power available from the present invention. This expressive power is much greater than that which is available from prior known input/output control arrangements.

The use of the Mailbox and Queue Descriptor creates the ability for decoupling the I/O channel command structure, headed by the Queue Descriptor for each separate channel, from the module specific information which is present at the Mailbox level. This creates the advantage of permitting channel structures to be created and deleted dynamically without having to preallocate the memory they require. On prior systems which incorporate both the module information and the device information at the same level, there is a requirement to statically allocate the memory for this information and never use that memory for any other purpose. Such arrangements create restrictions on how the operating system uses its main memory.

The indirection between Queue Descriptors and I/O Descriptors of the present invention allows two types of functions that are advantageous. One function is the ability to create I/O Descriptors, link them on to Device Queues, have them processed, and then remove them from the Device Queues without ever moving them in memory. I/O Descriptors can therefore join and leave Queues without actually being moved in memory. Another advantage of the indirection at this level is the ability for particular programs to pre-build sequences of I/O Descriptors through instructions instead of having to build the structure dynamically. By separating the sequencing of the operations into a linked list, the structure can be varied. In prior systems utilizing chaining, chaining consists of going to the next sequential command in a linear list. By making the list linked in the present invention, various programs can maintain pieces of the list and then access the Queue as is needed.

The reason to have the Transfer Control List independent and separately pointed to from the I/O Descriptor is that the buffers where data is to be sent or received may be a part of the application program. The I/0 operations may be performed on behalf of the application program by an agent, sometimes called an access method, an indexing routine, or the like, at ar intermediate level of software, and this intermediate level of software controls the operations to be performed at the I/O Descriptor level. It is the application program that is allocating and de-allocating the buffers to perform these operations. By allowing the description of the buffers to be built separately in a Transfer Control List, and then linked in with an indirect pointer from the I/O Descriptor, independent management is facilitated and the arrangement avoids the need for the I/O Descriptor and the Transfer Control List to be a part of the single structure. The number of buffers can change without having to change the length and possibly therefore move in memory the I/O Descriptor. A similar situation applies with respect to the Device Control Block.

More advantages will become apparent, after the present invention is fully comprehended by those skilled in the art.

The nature and details of the present invention have been described with a degree of specificity. It should be understood, however, that the description has been made by way of preferred example and that the invention itself is defined by the scope of the appended claims. In the following claims, terms such as Mailbox, Queue Descriptor, I/O Descriptor, etc. are employed for memory structures for the purposes of designating, not defining, the various structures recited. The scope of the meaning of such terms in the claims is intended to encompass only those elements which are specifically defined in the claims themselves, and not the full extent of the structures described in the foregoing description of a preferred embodiment, unless the preferred embodiment elements are specifically recited in the claims.

What is claimed is:

1. A method for communicating between at least one processor and a first and a second input/output (I/O) Device connected to one I/O adapter in a computer system, the computer system also including a main memory commonly connected to each processor and the I/O adapter, each I/O Device accomplishing data input to and data output from the computer system, the computer system also including software recorded within the main memory for controlling operational functions of the computer system, said communication method comprising the steps of:

establishing a first-level memory structure in the main memory for the I/O adapter at a predetermined memory address which is uniquely associated with the I/O adapter, each first-level memory structure being designated a Mailbox;

establishing a first and a second second-level memory structure each at a predetermined memory address in the main memory for the first and second I/O Devices, respectively, each second-level structure being designated a Queue Descriptor, the memory address of each Queue Descriptor being different from the memory address of the Mailbox;

establishing a plurality of third-level memory structures each at a predetermined memory address in the main memory, each third-level structure being designated an I/O Descriptor, one I/O Descriptor being established for each I/O operation to be performed by the first and second I/O Devices, the memory address of each I/O Descriptor being different from the predetermined memory address of any of the Mailbox, Queue Descriptor and I/O Descriptors;

placing data in each I/O Descriptor which includes command information that defines a specific I/O data transfer operation to be performed by an I/O Device;

placing data in at least one of either the Queue Descriptor or each I/O Descriptor associated with each I/O Device which includes information that links each I/O Descriptor associated with each I/O Device in a Queue in the order in which I/O operations are to be performed by that I/O Device, a first and a second Queue being thereby formed and respectively associated with the first and second I/O Devices;

placing data in each said first and second Queue Descriptor which (i) includes information that defines a memory address for accessing each said first and second Queue, and (ii) contains command information for polling the linked I/O Descriptors of each first and second Queue, respectively;

placing data in the Mailbox which includes information which (I) defines the memory address of a Queue Descriptor and (ii) contains command information to cause the I/O adapter to execute the command information in the Queue Descriptor;

and signaling the I/O adapter by action of the processor under control of the software to cause the I/O adapter to accomplish the following steps for each I/O Device:

locating the Mailbox at its predetermined memory address and reading and decoding the information in the Mailbox and executing commands defined by the command information in the Mailbox as a result of said signaling of the I/O adapter by action of the processor;

locating the Queue Descriptor at its predetermined memory address by using the memory address information obtained by decoding the information in the Mailbox, and reading and decoding the information in the Queue Descriptor and executing commands defined by the command information in the Queue Descriptor;

locating each I/O Descriptor at its predetermined memory address by using the queue linkage information obtained by decoding the information in the one of Queue Descriptor or I/O Descriptors, and reading and decoding the information in each I/O Descriptor and executing commands defined by the command information in each I/O Descriptor to perform I/O data transfers to and from the one I/0 Device;

communicating I/O data to the I/O adapter through the connection of each I/O Device to the I/O adapter; and communicating I/O data between the processor and I/O adapter by performing operations indicated by the information contained in the data placed in at least the queue Descriptors and the I/O Descriptors in the main memory, after the command information in the Mailbox has been executed.

2. A method as defined in claim 1 further comprising the steps of:

indicating for each of the Mailbox, the Queue Descriptor and the I/O Descriptor separately, by placing data in each, a first status indication that the information is currently awaiting processing, a second status indication that the information is being processed, and a third status indication that the information has been processed; and prohibiting each processor from placing new data in any Mailbox, Queue Descriptor or I/O Descriptor whenever said respective one Mailbox, Queue Descriptor and I/O Descriptor is in the first or second status.

3. A method as defined in claim 2 further comprising the step of indicating for each of the Mailbox, Queue Descriptor and I/O Descriptor separately, by placing data in each, a fourth status indication that the information has previously been interpreted.

4. A method as defined in claim 1 further comprising the steps of:

interlocking the data within each one of the Mailbox, Queue Descriptor and I/O Descriptor by placing data in each indicating a status indication that the command represented by the data is to yet completed; and prohibiting each processor from placing new data in any one of the Mailbox, Queue Descriptor and I/0 Descriptor which is indicated as exhibiting a not yet completed status indication.

5. A method as defined in claim 1 further comprising the steps of:

limiting substantially all of the processing functions of the computer system to the processor; and performing all location, reading decoding, and execution commands by the I/O adapter as a series of sequential operations created from the information contained in the data placed in the Mailbox, Queue Descriptor and each Queue of linked I/O Descriptors.

6. A method as defined in claim 1 further comprising the step of:

signaling the I/O adapter to execute the commands defined by the comamnd information contained in a Queue Descriptor and its Queue of linked I/O Descriptors for a selected I/O Device by sending a Device Attention signal to the I/O adapter; and causing the I/O adapter to process the command information in the Queue Descriptor associated with the selected I/O Device in response to receipt of the Device Attention signal.

7. A method as defined in claim 6 further comprising the step of:

sending first and second Device Attention signals to the I/O adapter to cause the I/O adapter to commence concurrent processing the first and second queue Descriptors and their associated first and second Queues of linked I/O Descriptors.

8. A method as defined in claim 1 further comprising the step of:

signaling the I/O adapter to execute the commands defined by the command information contained in the Mailbox by sending a Module Attention signal to the selected I/O adapter separately of any other signal; and causing the I/O adapter to process the command information in the Mailbox in response to the Module Attention signal.

9. A method as defined in claim 1 further comprising the step of:

signaling the processor for an interrupt by selectively placing data in the Queue Descriptor and Mailbox which contains information specifying an interrupt.

10. A method as defined in claim 1 further comprising the steps of:

establishing an additional memory structure associated with at least one of the I/O Descriptors at a predetermined memory address in the main memory, each additional memory structure being designated a Device Control Block, the memory address of each Device Control Block being different than the predetermined memory addresses of any of the Mailbox, Queue Descriptor and I/O Descriptor;

placing data in the Device Control Block which includes information that defines a continuation of the command information in the associated I/O Descriptor; and placing data in the associated I/O Descriptor which includes information defining the memory address of the Device Control Block, locating the Device Control Block at its predetermined memory location by using the memory address information obtained by decoding the information contained in the associated I/O Descriptor, and reading, decoding and executing the command information contained in the Device Control Block during execution by the I/O Device of the command information of the associated I/O Descriptor.

11. A method as defined in claim 1 further comprising the steps of:
recording at a predetermined memory address in main memory which is different than any other memory structure, any I/O data transferred during execution of the command information of each I/O Descriptor;
indicating for each I/O Descriptor by placing data therein a status indication that the command information within the I/O Descriptor has been executed;
placing data in one Queue Descriptor containing information indicating the updating of the status indication of any one of the I/O Descriptors in the Queue associated with the one Queue Descriptor; and
examining the status indication data placed in the one Queue Descriptor to determine if the I/O data transferred to the predetermined different memory address during execution of the command information of each I/O Descriptor should be examined by the processor under the control of the software.

12. A method as defined in claim 1 further comprising the steps of:
establishing a further memory structure at a predetermined memory address in main memory by action of the processor under control of the software, the further memory structure being designated as an Exception Status Block, the memory address of the Exception Status Block being different than the predetermined memory addresses of any of the Mailbox, Queue Descriptor and I/O Descriptor; and
placing data in the Exception Status Block by the I/O adapter upon detection of any error condition of operation of one of the I/O adapter or the I/O Device.

13. A method as defined in claim 1 further comprising the step of:
periodically polling the Queue of I/O Descriptors associated with each Queue Descriptor.

14. A method as defined in claim 1 further comprising the step of:
the I/O adapter proceeding from one I/O Descriptor to the next linked I/O Descriptor in the Queue of I/O Descriptors to perform all I/O data transfer associated with each I/O Device in a continuous manner.

15. A method as defined in claim 1 further comprising the steps of:
indicating for each of the Mailbox, the Queue Descriptor and the I/O Descriptor separately, by placing data in each, a first status indication tha tthe information is currently awaiting processing, a second status indication that the information is being processed, and a third status indication that the information has been processed; and
prohibiting each I/O adapter from placing new data in any Mailbox, Queue Descriptor and I/O Descriptor whenever said respective one of the Mailbox, Queue Descriptor and I/O Descriptor is in the third status.

16. A method as defined in claim 1 further comprising the steps of:
interlocking the data within each one of the Mailbox, Queue Descriptor and I/O Descriptor by placing data in each indicating a status indication that the command represented by the data in each has been completed; and
prohibiting each I/O adapter from placing new data in any one of the Mailbox, Queue Descriptor and I/O Descriptor which is indicated as exhibiting a has been completed status indication.

17. A method as defined in claim 1 further comprising the steps of:
establishing another memory structure associated with the I/O Descriptor at a predetermined memory address in main memory, each another memory structure being designated a Transfer Control List, the memory address of the Transfer Control List being different from the predetermined addresses of any of the Mailbox, the Queue Descriptor and the I/O Descriptor;
placing data in the Transfer Contorl List which contains information which defines a sequential list of buffers at predetermined memory address in main memory and the start address and length count of each buffer location;
placing data in the I/O Descriptor with which the Transfer Control List is associated which contains command information specifying the use of the Transfer Control List when performing I/O data transfers to and from the I/O Device; add
transferring I/O data to and from the buffers specified by information contained in the Transfer Control List by proceeding at the end of the length count of one buffer to the start address of the next sequentially buffer, as a result of executing the command information contained in the data placed in the associated I/O Descriptor.

18. A method as defined in claim 1 further comprising the step of:
the processor under the control of the software adding an additional I/O Descriptor to the Queue of I/O Descriptors while the I/O adapter is executing the command information of a different I/O Descriptor in the Queue.

19. A method as defined in claim 1 further comprising the step of:
the processor under the control of the software removing an I/O Descriptor from the Queue of I/O Descriptors while the I/O adapter is executing the command information of a different I/O Descriptor in the queue.

20. A method as defined in claim 1 wherein the steps of establishing the second-level and third-level memroy structures and of placing data in the first-level, second-level and third-level memory structures, are accomplished by the processor under the control of the software.

21. A method as defined in claim 1 further comprising the steps of:
placing data in one Queue Descriptor containing status information and masking information, the status information indicating a predetermined condition which occurred while processing the Queue of linked I/O Descriptors associated with the one Queue Descriptor, the masking information selectively indicating whether an interrupt request signal should or should not be delivered from the I/O adapter to the one processor upon occurrence of the predetermined condition; and the I/O adapter delivering an itnerrupt request signal to the one processor only when the masking information indicates that an interrupt signal should be delivered and not delivering the interrupt request signal when the masking information indicates at the interrupt request signal should not be delivered.

22. A method as defined in claim 1 wherein the computer system comprises a plurality of processors, said method further comprising the steps of:

placing data in one Queue Descriptor containing status information, masking information and processor designating information, the status information indicating a predetermined condition which occurred while processing the Queue Descriptor, the masking information selectively indicating whether an interrupt request signal should or should not be delivered from the I/O adapter to a processor upon occurrence of the predetermined condition, the processor designation information designating one of the plurality the processors to which it is desired to deliver an interrupt request signal upon the occurrence of the predetermined condition; and the I/O adapter delivering an interupt request signal to the designated processor only when the masking information indicates that an interrupt signal should be delivered and not delivering the interrupt request signal when the masking information indicates at the interrupt request signal should not be delivered.

23. A method of controlling input/output I/0) data transfer operations between a processor and a plurality of I/O Devices connected to one I/O adapter in a computer system having a system memory commonly connected to both the processor and the I/O adapter, comprising the steps of:

establishing in the system memory at predetermined different locations a first-level memory structure (a Mailbox), a first and a second second-level memory structure (first and second Queue Descriptors), and a plurality of third-level memory structure (each an I/O Descriptor);

associating the first and second Queue Descriptors with first and a second I/O Device, respectively;

placing data indicating address and command information in each memory structure by operations of the processor, the address information in the Mailbox identifying the memory location of a Queue Descriptor, the address information in each Queue descriptor and in a plurality of I/O Descriptors identifying a Queue of linked I/O Descriptors, the command information in the Mailbox causing the I/O adapter to create or recognize a Queue Descriptor at the address of the address information in the Mailbox, the command information in the Queue Descriptor specifying that the Queue of linked I/O Descriptors is to be processed, the command information in each I/O Descriptor specifying an I/O data transfer operation to be performed by one of the I/O Devices;

signaling the IO) adapter with a first signal from the processor to inspect the Mailbox and to execute the command information to recognize a Queue Descriptor for each I/O Device;

signaling the I/O adapter with a second signal from the process to (i) execute the command information in the Queue Descriptor associated with each I/O Device to initiate the processing of the Queue of linked I/O Descriptors and to (ii) execute the command information in the Queue of linked I/O Descriptors to perform the I/O data transfer operations specified by the linked I/O Descriptors in the Queue;

concurrently executing the command information in the first and second Queue Descriptors by action of the I/O adapter and the associated first and second I/O Devices, after signaling the I/O adapter with one said first and one said second signal for each I/O Device;

communicating I/O data to the I/O adapter through the connection of each I/O Device to the I/O adapter; and communicating I/O data between the processor and I/O adapter by using memory structures in the system memory, after the command information in the Mailbox has been executed.

24. A method as defined in claim 23 further comprising the steps of:

indicating for each of the Mailbox, the Queue descriptor and the I/O Descriptor separately, by placing data in each, a first status indication that the information is currently awaiting processing, a second status indication that the information is being processed, and a third status indication that the information has been processed; and prohibiting each processor from placing new data in any Mailbox, Queue Descriptor or I/O Descriptor whenever said respective one Mailbox, Queue Descriptor and I/O Descriptor is in the first or second status.

25. A method as defined in claim 23 further comprising the steps of:

placing data in the memory structures by operation of the I/O adapter during communication between the processor and the adapter;

indicating for each of the Mailbox, the Queue descriptor and the I/O Descriptor separately, by placing data in each, a first status indication that the information is currently awaiting processing, a second status indication that the information is being processed, and a third status indication that the information has been processed; and prohibiting each adapter from placing new data in any Mailbox, Queue Descriptor and I/O Descriptor whenever said respective one of the Mailbox, Queue Descriptor and I/O Descriptor is in the third status.

26. A method as defined in claim 23 further comprising the step of:

periodically polling the Queue of I/O Descriptors associated with each Queue Descriptor.

27. A method as defined in claim 23 further comprising the steps of:

placing data in one queue Descriptor containing status information and masking information, the status information indicating a predetermined condition which occurred while processing the Queue of linked I/O Descriptors associated with the one Queue Descriptor, the masking information selectively indicating whether an interrupt request signal should or should not be delivered from the I/O adapter to the one processor upon occurrence of the predetermined condition; and the I/O adapter delivering an interrupt request signal to the one processor only when the masking information indicates that an interrupt signal should be delivered and not delivering the interrupt request signal when the masking information indicates at the interrupt request signal should not be delivered.

28. A method as defined in claim 23 further comprising the steps of:

establishng an additional memory structure (a Device Control Block) associated with at least one of the I/O Descriptors at a predetermined memory address in the main memory, the memory address of each Device Control Block being different than the predetermined memory addresses of any of the Mailbox, Queue Descriptor and I/O Descriptor;

placing data in the Device Control Block which includes information that defines a continuation of the command information in the associated I/O Descriptor; and placing data in the associated I/O Descriptor which includes information defining the memory address of the Device Control Block, locating the Device Control Block at its predetermined memory location by using the memory address information obtained by decoding the information in the associated I/O Descriptor, and reading, decoding and executing the command information contained in the Device Control Block during execution by the I/O Device of the command information of the associated I/O Descriptor.

29. A method as defined in claim 23 further comprising the steps of:

establishing another memory structure (a Transfer Control List) associated with an I/O Descriptor at a predetermined memory address in main memory, the memory address of the Transfer control List being different from the predetermined addresses of any of the Mailbox, the Queue Descriptor and the I/O Descriptor;

placing data in the Transfer Control List which contains information which defines a sequential list of buffers at predetermined memory addresses in main memory and the start address and length count of each buffer location;

placing data in the I/O Descriptor with which the transfer Control List is associated which contains command information specifying the use of the Transfer Control List when performing forming I/O data transfers to and from the I/O Device; and transferring I/O data to and from the buffers specified by information contained in the Transfer Control List by proceeding at the end of the length count of one buffer to the start address of the next sequential buffer, as a result of executing the command information contained in the associated I/0 Descriptor.

30. A method as defined in claim 23 further comprising the steps of:

recording at a predetermiend memory address in main memory which is different than any other memory structure, any I/O data transferred during execution of the command information of each I/O Descriptor;

indicating for each I/O Descriptor by placing data therein a status indication that the command information within the I/O Descriptor has been executed;

placing data in one Queue Descriptor containing information indicating the updating of the status indication of any one of the I/O Descriptors in the Queue associated with the one Queue Descriptor; and examining the status indication data placed in the one Queue Descriptor to determine if the I/O data transferred to the predetermined different memory address during execution of the command information of each I/O Descriptor should be examined by the processor.

31. A method as defined in claim 23 further comprising the steps of:

establishing a further memory structure (an Exception Status Block) at a predetermined memory address in main memory by action of the processor, the memory address of the Exception Status Block being different than the predetermined memory addresses of any of the Mailbox, Queue Descriptor and I/O Descriptor; and placing data in the Exception Status Block by the I/O adapter upon detection of any error condition of operation of one of the I/O adapter or the I/O Device.

* * * * *